(12) United States Patent
Miyamoto et al.

(10) Patent No.: US 12,105,902 B2
(45) Date of Patent: Oct. 1, 2024

(54) METHOD TO BE PERFORMED BY STYLUS AND SENSOR CONTROLLER, STYLUS, AND SENSOR CONTROLLER

(71) Applicant: Wacom Co., Ltd., Saitama (JP)

(72) Inventors: Masayuki Miyamoto, Saitama (JP); Haruhiko Hisano, Saitama (JP); Sadao Yamamoto, Saitama (JP); Hideyuki Hara, Saitama (JP); Yoshifumi Konda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/333,360

(22) Filed: Jun. 12, 2023

(65) Prior Publication Data

US 2023/0325012 A1 Oct. 12, 2023

Related U.S. Application Data

(63) Continuation of application No. 17/872,853, filed on Jul. 25, 2022, now Pat. No. 11,714,500, which is a
(Continued)

(30) Foreign Application Priority Data

Jul. 8, 2020 (JP) ................................ 2020-117528

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *G06F 3/04162* (2019.05);
(Continued)

(58) Field of Classification Search
CPC .............. G06F 3/0383; G06F 3/03545; G06F 3/04162; G06F 3/0412; G06F 3/04166; G06F 3/0446; G06F 3/038; G06F 3/0414
See application file for complete search history.

(56) References Cited

U.S. PATENT DOCUMENTS 4,878,553 A * 11/1989 Yamanami .............. G06F 3/046
341/15
5,414,227 A 5/1995 Schubert et al.
(Continued)

FOREIGN PATENT DOCUMENTS

| JP | 2017068873 A | 4/2017 |
| WO | 2016/129194 A1 | 8/2016 |
| WO | WO 2018016466 A1 | 1/2018 |

*Primary Examiner* — Benyam Ketema
(74) *Attorney, Agent, or Firm* — Seed IP Law Group LLP

(57) ABSTRACT

A method to be performed by a sensor controller that periodically transmits an uplink signal, and by a stylus that, upon receiving the uplink signal, determines a transmission and reception schedule for a downlink signal and the uplink signal on the basis of the reception timing of the uplink signal. The method includes executing, by the stylus, an uplink signal receiving operation for a first predetermined period of time according to the transmission and reception schedule. The method includes, responsive to the uplink signal not received through the receiving operation and expiration of the first predetermined period of time, continuing, by the stylus, the uplink signal receiving operation for a second predetermined period of time, instead of transmitting the downlink signal according to the transmission and reception schedule.

8 Claims, 14 Drawing Sheets

Related U.S. Application Data continuation of application No. 17/323,447, filed on May 18, 2021, now Pat. No. 11,397,482.

(51) Int. Cl.
  *G06F 3/041* (2006.01)
  *G06F 3/044* (2006.01)

(52) U.S. Cl.
  CPC ........ *G06F 3/0412* (2013.01); *G06F 3/04166* (2019.05); *G06F 3/0446* (2019.05)

(56) References Cited

U.S. PATENT DOCUMENTS

| | | | | |
|---|---|---|---|---|
| 5,475,401 A * | 12/1995 | Verrier | G06F 3/0418 | 345/179 |
| 5,528,002 A * | 6/1996 | Katabami | G06F 3/0442 | 178/20.01 |
| 5,565,632 A * | 10/1996 | Ogawa | G06F 3/03545 | 73/862.041 |
| 5,576,502 A * | 11/1996 | Fukushima | G06F 3/03545 | 73/862.68 |
| 5,633,471 A * | 5/1997 | Fukushima | G06F 3/03545 | 73/865.4 |
| 5,644,108 A * | 7/1997 | Katsurahira | G06F 3/03545 | 345/174 |
| 5,661,269 A * | 8/1997 | Fukuzaki | G06F 3/046 | 178/20.02 |
| 5,699,084 A * | 12/1997 | Fukuzaki | G06F 3/03545 | 345/179 |
| 5,854,448 A | 12/1998 | Nozaki et al. | | |
| 5,914,708 A * | 6/1999 | LaGrange | G06F 3/03545 | 178/19.03 |
| D417,206 S * | 11/1999 | Hirota | D14/411 | |
| 5,977,958 A * | 11/1999 | Baron | G01S 5/22 | 382/187 |
| 6,005,555 A | 12/1999 | Katsurahira et al. | | |
| 6,064,374 A * | 5/2000 | Fukuzaki | G06F 3/03545 | 178/19.03 |
| 6,259,438 B1 * | 7/2001 | Fleck | G06F 3/03545 | 345/184 |
| 6,744,426 B1 | 6/2004 | Okamoto et al. | | |
| 7,095,404 B2 * | 8/2006 | Vincent | G06F 3/03545 | 345/107 |
| D531,217 S * | 10/2006 | Hirota | D19/184 | |
| 7,685,538 B2 * | 3/2010 | Fleck | G06F 3/038 | 345/157 |
| D614,623 S * | 4/2010 | Crisp | D14/411 | |
| 10,061,408 B2 | 8/2018 | Hara | | |
| 10,061,411 B2 * | 8/2018 | Peretz | G06F 3/016 | |
| 10,073,558 B2 * | 9/2018 | Kobori | G06F 3/0446 | |
| 10,095,329 B1 * | 10/2018 | Laslo | H03F 3/217 | |
| 10,296,039 B2 * | 5/2019 | Katsurahira | G06F 3/04162 | |
| 10,401,985 B2 | 9/2019 | Hara et al. | | |
| 10,452,168 B2 | 10/2019 | Oda et al. | | |
| 10,459,540 B2 | 10/2019 | Hara | | |
| 10,466,816 B2 | 11/2019 | Watanabe | | |
| 10,514,785 B1 * | 12/2019 | Hara | G06F 3/04162 | |
| 10,732,735 B2 * | 8/2020 | Hara | G06F 3/044 | |
| 10,761,619 B2 * | 9/2020 | Park | G08C 17/02 | |
| 10,775,910 B2 | 9/2020 | Oda et al. | | |
| 10,809,817 B2 * | 10/2020 | Katsurahira | G06F 3/0446 | |
| 10,942,598 B2 | 3/2021 | Koike et al. | | |
| 10,976,839 B2 | 4/2021 | Hara et al. | | |
| 11,054,921 B2 | 7/2021 | Hara | | |
| 11,385,725 B2 * | 7/2022 | Kamiyama | G06F 3/0317 | |
| 2004/0039545 A1 * | 2/2004 | Katsurahira | G06F 3/046 | 702/150 |
| 2005/0057535 A1 * | 3/2005 | Liu | G06T 11/203 | 345/179 |
| 2008/0238885 A1 * | 10/2008 | Zachut | G06F 3/03545 | 345/174 |
| 2009/0065268 A1 * | 3/2009 | Katsurahira | G06F 3/03545 | 178/19.01 |
| 2010/0051356 A1 * | 3/2010 | Stern | G06F 3/0442 | 178/19.04 |
| 2010/0207607 A1 * | 8/2010 | Katsurahira | G06F 3/038 | 324/207.11 |
| 2010/0321288 A1 * | 12/2010 | Katsurahira | G06F 3/04166 | 345/156 |
| 2011/0155479 A1 * | 6/2011 | Oda | G06F 3/044 | 178/19.04 |
| 2012/0086664 A1 * | 4/2012 | Leto | B43K 8/003 | 345/173 |
| 2012/0105362 A1 * | 5/2012 | Kremin | G06F 3/0446 | 345/174 |
| 2014/0002422 A1 * | 1/2014 | Stern | G06F 3/0383 | 345/179 |
| 2014/0176495 A1 * | 6/2014 | Vlasov | G06F 3/0441 | 345/174 |
| 2014/0298244 A1 * | 10/2014 | Kim | G06F 3/04855 | 715/780 |
| 2015/0153845 A1 * | 6/2015 | Chang | G06F 3/0442 | 345/179 |
| 2015/0205387 A1 * | 7/2015 | Osterhout | G09G 5/12 | 345/179 |
| 2015/0212600 A1 * | 7/2015 | Zerayohannes | G06F 3/03545 | 345/179 |
| 2015/0363012 A1 * | 12/2015 | Sundara-Rajan | G06F 3/0441 | 345/179 |
| 2016/0034752 A1 * | 2/2016 | Tung | G06F 3/04883 | 382/189 |
| 2016/0299583 A1 * | 10/2016 | Watanabe | G06F 3/0441 | |
| 2016/0320918 A1 * | 11/2016 | Hara | G06F 3/044 | |
| 2017/0108984 A1 * | 4/2017 | Takaya | G06F 3/0441 | |
| 2017/0192549 A1 * | 7/2017 | Katayama | G06F 3/041 | |
| 2017/0285772 A1 * | 10/2017 | Yamamoto | G06F 3/0442 | |
| 2018/0024654 A1 * | 1/2018 | Koike | G06F 3/0441 | 345/174 |
| 2018/0046272 A1 * | 2/2018 | Hara | G06F 3/044 | |
| 2018/0052534 A1 * | 2/2018 | Ron | G06T 11/60 | |
| 2018/0113519 A1 * | 4/2018 | Yamamoto | G06F 3/038 | |
| 2018/0113523 A1 * | 4/2018 | Hara | G06F 3/04162 | |
| 2018/0120962 A1 * | 5/2018 | Hara | G06F 3/04162 | |
| 2018/0120963 A1 * | 5/2018 | Hara | G06F 3/041 | |
| 2018/0157341 A1 | 6/2018 | Oda et al. | | |
| 2018/0181231 A1 * | 6/2018 | Ishikura | G06F 3/0488 | |
| 2018/0188836 A1 * | 7/2018 | Park | G06F 3/03545 | |
| 2018/0232070 A1 * | 8/2018 | Katsurahira | G06F 3/0442 | |
| 2018/0329524 A1 * | 11/2018 | Yamamoto | G06F 3/038 | |
| 2019/0121455 A1 * | 4/2019 | Hara | G06F 3/0383 | |
| 2019/0146603 A1 | 5/2019 | Oda et al. | | |
| 2019/0179434 A1 * | 6/2019 | Tanaka | G06F 3/046 | |
| 2019/0227644 A1 * | 7/2019 | Nakayama | G06F 3/03545 | |
| 2019/0346970 A1 * | 11/2019 | Yamamoto | H04B 1/7073 | |
| 2019/0384423 A1 * | 12/2019 | Hara | G06F 3/0416 | |
| 2019/0384425 A1 * | 12/2019 | Oda | G06F 3/03546 | |
| 2020/0133436 A1 * | 4/2020 | Chen | G06F 3/04162 | |
| 2020/0249772 A1 * | 8/2020 | Yamamoto | G06F 3/03545 | |
| 2021/0191592 A1 | 6/2021 | Koike et al. | | |
| 2021/0200345 A1 * | 7/2021 | Chang | G06F 3/03545 | |
| 2021/0263601 A1 * | 8/2021 | Choi | G06F 3/03545 | |
| 2021/0357045 A1 * | 11/2021 | Kadowaki | G06F 3/016 | |
| 2022/0057870 A1 * | 2/2022 | Miyamoto | G06F 3/0442 | |
| 2022/0187941 A1 * | 6/2022 | Park | G06F 3/0416 | |
| 2022/0197468 A1 * | 6/2022 | Lee | G06F 3/0442 | |
| 2022/0300092 A1 * | 9/2022 | Kamiyama | G06F 3/04162 | |
| 2022/0326805 A1 * | 10/2022 | Lin | G06F 3/03545 | |
| 2022/0334701 A1 * | 10/2022 | Cheng | G06F 3/04162 | |
| 2022/0365654 A1 * | 11/2022 | Lee | G06F 3/044 | |

* cited by examiner

F I G . 2
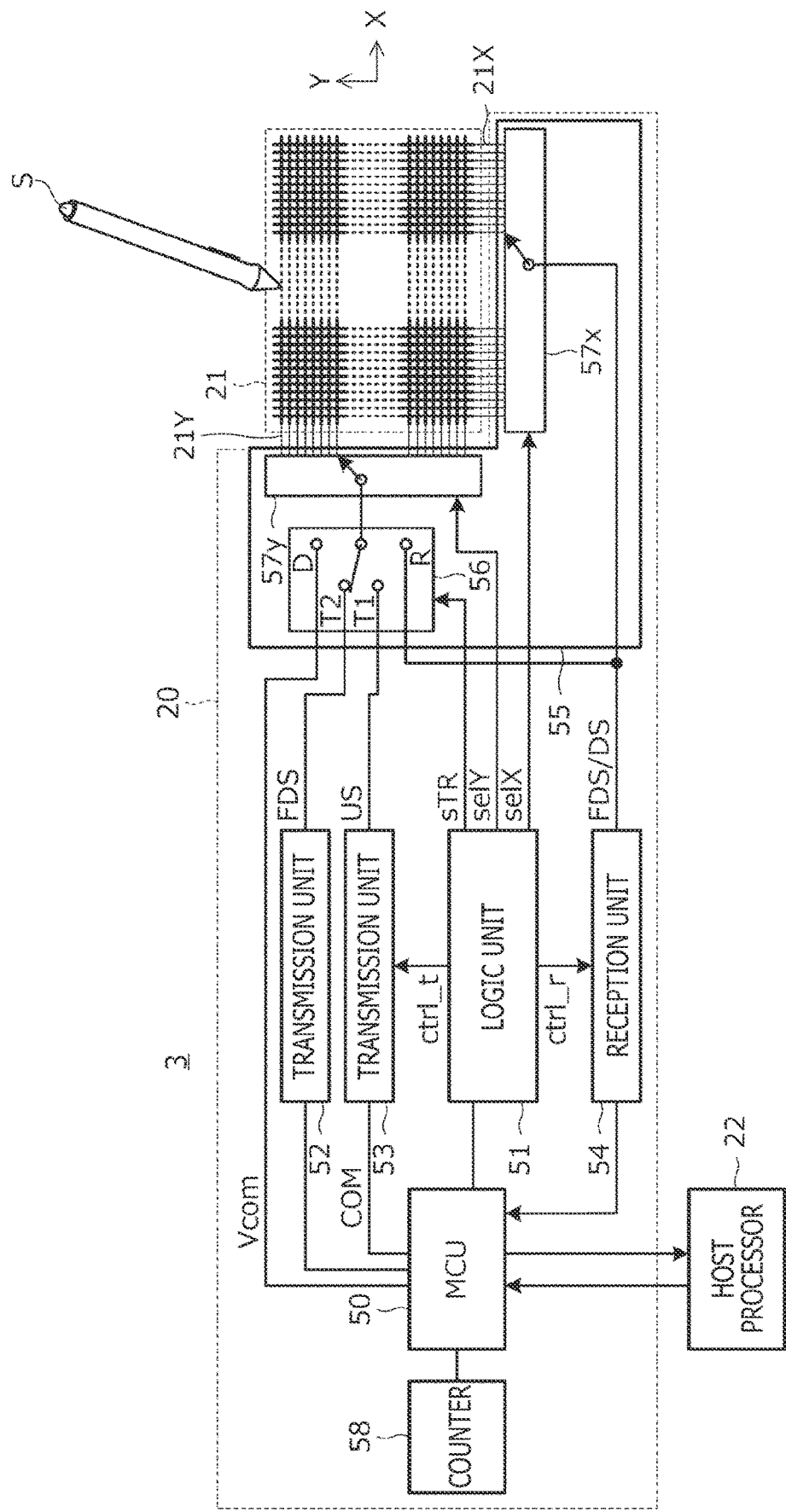

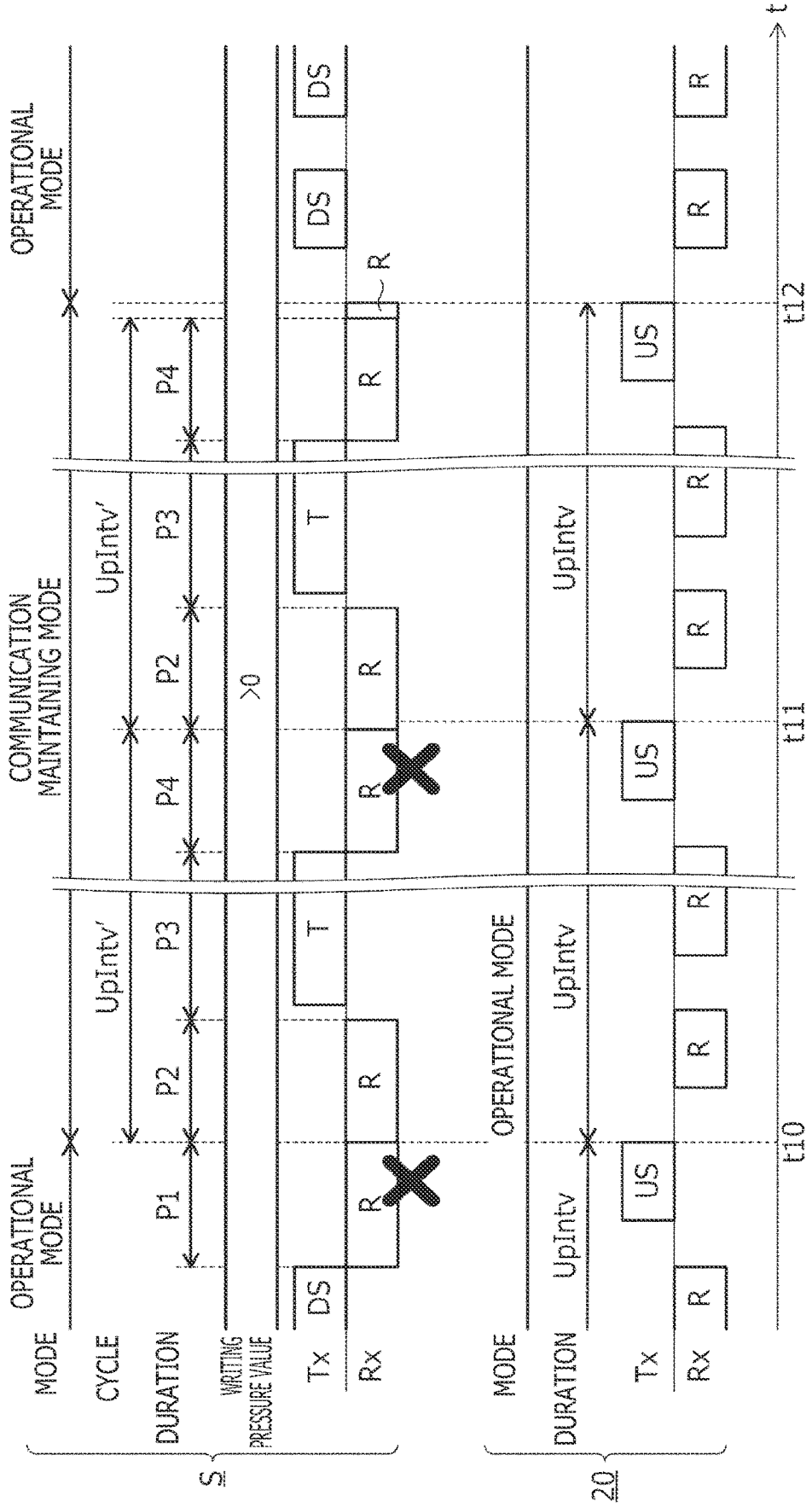

METHOD TO BE PERFORMED BY STYLUS AND SENSOR CONTROLLER, STYLUS, AND SENSOR CONTROLLER

BACKGROUND OF THE INVENTION

1. Field of the Invention

The present invention relates to a method to be performed by a stylus and a sensor controller, the stylus, and the sensor controller.

2. Description of the Related Art

Electronic devices that can handle handwriting inputs using styluses have been known. An electronic device of this type typically includes a touch sensor that is disposed in a touch surface, and a sensor controller that is connected to the touch sensor. The sensor controller is an integrated circuit having a function of performing bidirectional communication with a stylus via the touch sensor. The sensor controller is configured to detect the position of a stylus on the touch surface by transmitting an uplink signal via the touch sensor and receiving, via the touch sensor, a downlink signal transmitted from the stylus in response to the uplink signal. The uplink signal is used to notify the stylus of transmission and reception timings of downlink and uplink signals, and to transmit a command for specifying data to be transmitted from the stylus. The uplink signal is transmitted by the sensor controller in a fixed cycle.

PCT Patent Publication No. WO2016/129194 discloses an example of a stylus that transmits a downlink signal on the basis of an uplink signal reception timing. The stylus of this example initially operates in a discovery state of performing an uplink signal receiving operation in a fixed cycle. When an uplink signal is received as a result of the receiving operation, the stylus is shifted to an operation state of performing bidirectional communication with a sensor controller. The stylus in the operation state executes a downlink signal transmitting operation and an uplink signal receiving operation according to a transmission and reception schedule which is determined on the basis of the uplink signal reception timing. When reception of an uplink signal according to the transmission and reception schedule fails, the stylus is returned to a discovery state to execute an uplink signal receiving operation.

The sensor controller disclosed in PCT Patent Publication No. WO2016/129194 is configured to, upon receiving a downlink signal from the stylus, establish pairing with the stylus, and to cancel the pairing with the stylus when receiving no downlink signal from the stylus for a fixed period of time or longer. Therefore, when the stylus returns to the discovery state, the pairing is canceled by the sensor controller after a while.

A stylus that is located at a position near a touch surface where the stylus can normally receive an uplink signal may, in some cases, fail to receive an uplink signal. In such cases, transmission of downlink signals from the stylus is suspended. Thus, the sensor controller becomes unable to detect the position of the stylus, and further, pairing is also canceled after a while. To users, this occurrence generates a situation where the user's writing operation is suddenly disabled. A need exists for a remedial measure against such situation.

SUMMARY OF THE INVENTION

One aspect of the present invention is directed to providing a method, which is to be executed by a stylus and a sensor controller, for avoiding occurrence of a situation where writing that is being executed is suddenly disabled, and the related stylus and the related sensor controller.

A method according to one aspect of the present invention is performed by a sensor controller that periodically transmits an uplink signal, and by a stylus that, upon receiving the uplink signal, determines a transmission and reception schedule for a downlink signal and the uplink signal on the basis of the reception timing of the uplink signal. The method includes: by the stylus, executing an uplink signal receiving operation for a first predetermined period of time according to the transmission and reception schedule; and, when the uplink signal has not been received through the receiving operation but the first predetermined period of time has elapsed, continuing the uplink signal receiving operation for a second predetermined period of time, instead of transmitting the downlink signal according to the transmission and reception schedule.

A method according to another aspect of the present invention is performed by a sensor controller that periodically transmits an uplink signal, and by a stylus that, upon receiving the uplink signal, determines a transmission and reception schedule for a downlink signal and the uplink signal on the basis of the reception timing of the uplink signal. The method includes: by the stylus, starting an uplink signal receiving operation according to the transmission and reception schedule; and, when the uplink signal has not been received through the receiving operation but the first predetermined period of time has elapsed, transmitting a tone signal, irrespective of content of the unreceived uplink signal.

A stylus according to one aspect of the present invention determines, upon receiving an uplink signal from a sensor controller configured to periodically transmit the uplink signal, a transmission and reception schedule for a downlink signal and the uplink signal on the basis of the reception timing of the uplink signal. The stylus executes an uplink signal receiving operation for a first predetermined period of time according to the transmission and reception schedule, and, when the uplink signal has not been received through the receiving operation but the first predetermined period of time has elapsed, continues the uplink signal receiving operation for a second predetermined period of time, instead of transmitting the downlink signal according to the transmission and reception schedule.

A stylus according to another aspect of the present invention determines, upon receiving an uplink signal from a sensor controller configured to periodically transmit the uplink signal, a transmission and reception schedule for a downlink signal and the uplink signal on the basis of the reception timing of the uplink signal. The stylus starts an uplink signal receiving operation according to the transmission and reception schedule, and, when the uplink signal has not been received through the receiving operation but the first predetermined period of time has elapsed, transmits a tone signal irrespective of content of the unreceived uplink signal.

A sensor controller according to one aspect of the present invention periodically transmits an uplink signal to a stylus that determines a transmission and reception schedule for a downlink signal and the uplink signal on the basis of the reception timing of the uplink signal. The sensor controller includes a counter that indicates an elapsed time from reception of the last downlink signal, cancels pairing with the stylus when a value of the counter exceeds a predetermined period of time, determines whether or not content of the downlink signal received from the stylus is consistent with a request issued through the uplink signal, and, when determining that the content of the downlink signal received from the stylus is inconsistent with the request issued through the uplink signal, resets the counter.

According to one aspect of the present invention, since the possibility that the stylus fails to receive the uplink signal can be reduced, occurrence of a situation where the user's writing operation is suddenly disabled can be avoided.

According to another aspect of the present invention, since transmission of the tone signal from the stylus is continued even when reception of the uplink signal fails, the sensor controller can continuously detect the position of the stylus, and further, cancellation of the pairing can be avoided. Accordingly, occurrence of a situation where the user's writing operation is suddenly disabled can be avoided.

BRIEF DESCRIPTION OF THE DRAWINGS

FIG. 2 is a diagram illustrating an inner configuration of a sensor controller and a touch sensor illustrated in FIG. 1;

FIG. 14 is a sequence diagram of operations of the stylus and the sensor controller according to a modification of the present embodiment.

DETAILED DESCRIPTION OF THE PREFERRED EMBODIMENT

Hereinafter, an embodiment of the present invention will be explained in detail with reference to the attached drawings.

Figure 1:
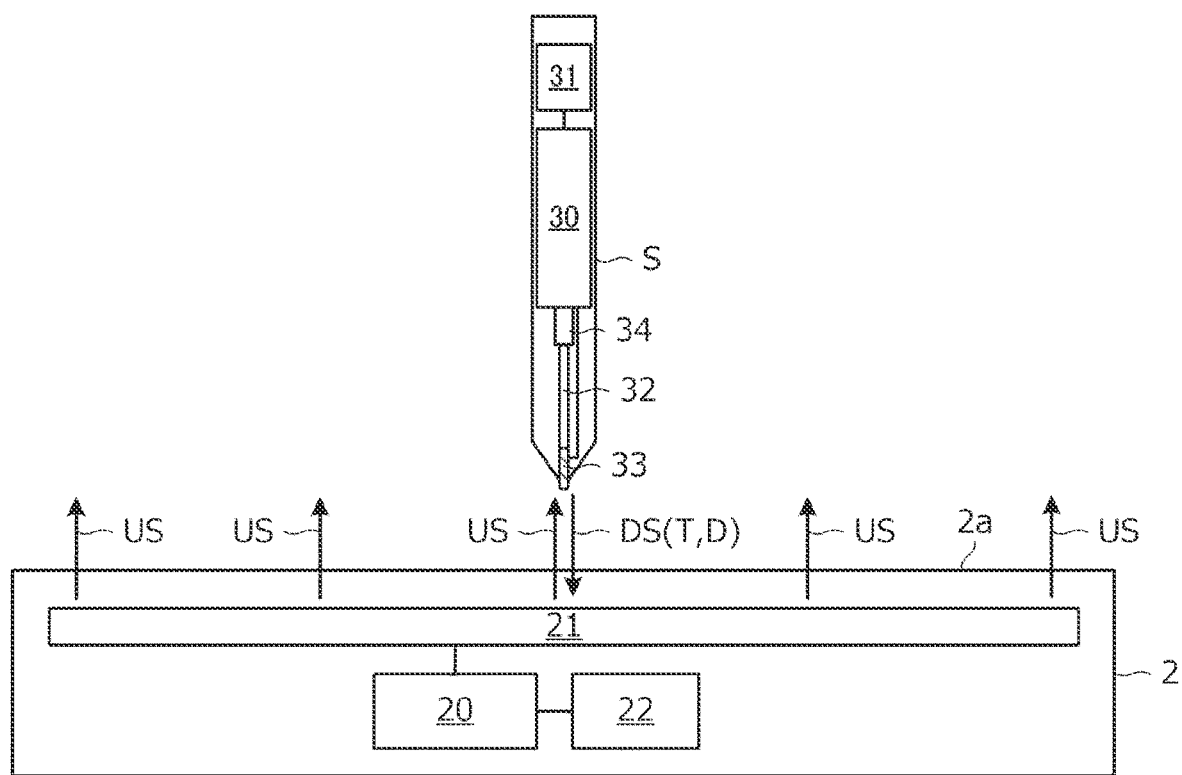
FIG. 1 is a diagram illustrating an electronic device and a stylus according to an embodiment of the present invention.

FIG. 1 is a diagram illustrating an electronic device 2 and a stylus S according to an embodiment of the present invention. The electronic device 2 is equipped with a tablet computer or a digitizer, for example. As illustrated in FIG. 1, the electronic device 2 includes a sensor controller 20, a touch sensor 21, and a host processor 22. In a case where the electronic device 2 is a tablet computer, the electronic device 2 is formed with a display.

The sensor controller 20 is an integrated circuit that performs bidirectional communication with the stylus S via the touch sensor 21. The sensor controller 20 is configured to acquire a position, on a touch surface 2a, pointed to by the stylus S, to acquire data transmitted from the stylus S through the bidirectional communication with the stylus S, and to sequentially supply the position and the data to the host processor 22, as will be explained in detail later with reference to FIG. 2. The sensor controller 20 also executes a process of acquiring a position, on the touch surface 2a, pointed to by a finger, and sequentially supplying the position to the host processor 22.

The specific type of the bidirectional communication between the stylus S and the sensor controller 20 is not limited to any particular type. Hereinafter, an explanation will be given on the assumption that active capacitive communication is utilized. Besides the active capacitive communication, electromagnetic resonance (EMR) communication can be utilized, for example. In addition, hereinafter, a signal that is transmitted from the sensor controller 20 to the stylus S is referred to as an uplink signal US, and a signal that is transmitted from the stylus S to the sensor controller 20 is referred to as a downlink signal DS. An uplink signal US includes a command that indicates what control is to be performed on the stylus S. A downlink signal DS includes a tone signal. which is a non-modulated carrier wave signal, and a data signal, which is a modulated carrier wave signal modulated with a predetermined type of data.

The touch sensor 21 includes a plurality of sensor electrodes disposed in the touch surface 2a. The details of the touch sensor 21 will be explained later with reference to FIG. 2.

The host processor 22 is a central processing unit of the electronic device 2, and serves to control various units or portions of the electronic device 2, and to execute various applications by reading and executing a program stored in an internal memory. The various applications to be executed by the host processor 22 can include a drawing application. For example, the drawing application is configured to have a function of generating stroke data on the basis of data (a position pointed to by the stylus S or a finger, and data transmitted from the stylus S) supplied from the sensor controller 20, a function of generating digital ink on the basis of the generated stroke data, and a function of rendering the generated digital ink to display it on the display.

As illustrated in FIG. 1, the stylus S includes a processing circuit 30, a battery 31, a core body 32, a pen electrode 33, and a pressure sensor 34. The processing circuit 30 is a processor that executes various types of processing in the stylus S, which will be explained later, by reading and executing a program stored in an internal memory, and is configured to operate with power supplied from the battery 31. The core body 32 is a member forming the pen point of the stylus S. The pen electrode 33 is a conductive body disposed near the pen tip end of the core body 32, and is electrically connected to the processing circuit 30. The pressure sensor 34 is a sensor that detects a writing pressure value representing a pressure applied to the pen point of the stylus S, and is connected to the rear end of the core body 32. The writing pressure value detected by the pressure sensor 34 is supplied to the processing circuit 30.

The processing circuit 30 receives an uplink signal US via the pen electrode 33, and executes a process of determining, on the basis of the reception timing of the uplink signal US and information included in the uplink signal US, a transmission and reception schedule for a downlink signal DS and an uplink signal US. The details of this determination will be explained later. Further, the processing circuit 30 executes a process of generating a downlink signal DS, under the control of a command included in the uplink signal US, and transmitting the downlink signal DS via the pen electrode 33. The downlink signal DS thus generated is formed of a tone signal T only, or of a tone signal T and a data signal D in accordance with an instruction indicated by the command included in the uplink signal US. Data that is transmitted through the data signal D can include a pen identification (ID) that is previously stored in the internal memory of the processing circuit 30, and the like, in addition to the abovementioned writing pressure value.

FIG. 2 is a diagram illustrating the internal configuration of the sensor controller 20 and the touch sensor 21. As illustrated in FIG. 2, the touch sensor 21 includes a plurality of sensor electrodes 21X and a plurality of sensor electrodes 21Y. In a case where the touch surface 2a includes a display surface of the display, the sensor electrodes 21X or the sensor electrodes 21Y are used also as common electrodes of the display. The electronic device 2 of a type using the sensor electrodes 21X or the sensor electrodes 21Y as common electrodes is called an "in-cell type," for example. On the other hand, the electronic device 2 of a type including a common electrode of the display separately from the sensor electrodes 21X and 21Y is called an "out-cell type" or an "on-cell type," for example. The following explanation is based on the assumption that the electronic device 2 is an in-cell type. However, the present invention is also applicable to an electronic device of an out-cell type or an on-cell type.

In a case where the display executes a pixel driving process, it is necessary to maintain the potential of each common electrode at a predetermined common potential Vcom. Thus, in the electronic device 2 that is an in-cell type, the sensor controller 20 cannot communicate with the stylus S or detect any finger when the display is executing the pixel driving process. Therefore, the sensor controller 20 is configured to communicate with the stylus S and detect a finger by using a horizontal blanking interval and a vertical blanking interval during which the pixels are not driven. Specifically, regarding a display period of one screen as one frame, in which a horizontal blanking interval constitutes one time slot and a vertical blanking interval constitutes one time slot, the sensor controller 20 is configured to communicate with the stylus S and detect a finger within these time slots.

As illustrated in FIG. 2, the sensor controller 20 includes a micro controller unit (MCU) 50, a logic unit 51, transmission units 52 and 53, a reception unit 54, a selection unit 55, and a counter 58.

The MCU 50 and the logic unit 51 are control units that control a transmission and reception operation of the sensor controller 20 by controlling the transmission units 52 and 53, the reception unit 54, and the selection unit 55. Specifically, the MCU 50 is a microprocessor that has an internal read-only memory (ROM) and an internal random access memory (RAM), and operates by executing programs stored in the ROM and the RAM. The MCU 50 also has a function of outputting a common potential Vcom and a command COM. The command COM corresponds to a command included in an uplink signal US. On the other hand, the logic unit 51 is configured to output control signals ctrl_t, ctrl_r, sTR, selX, and selY, under the control of the MCU 50.

A command COM which is outputted from the MCU 50 may include, for example, information that specifies a set of information relating to a transmission and reception schedule, information indicating a time slot and a frequency allocated to the stylus S, information indicating the details of data to be transmitted through the data signal D from the stylus S, and the like. Here, the set of information relating to a transmission and reception schedule may be one of information sets regarding a transmission and reception schedule previously shared by the sensor controller 20 and the stylus S. Each of these information sets may include, for example, information regarding the time length (=cycle UpIntv) of one frame, and information regarding arrangement of time slots in one frame.

The MCU 50 may previously store a set of information relating to a transmission and reception schedule according to the display of the electronic device 2, and may include, in the command COM, information that specifies the set of information. In addition, the MCU 50 may determine, on the basis of the number of paired styluses S, one or more time slots and a frequency to be allocated to each stylus S, and include the time slots and the frequency in the command COM. As a result, the sensor controller 20 can simultaneously be paired with a plurality of styluses S by time division multiplexing or frequency division multiplexing, for example. However, the following explanation is based on the assumption that the sensor controller 20 communicates with one stylus S only. The transmission unit 52 is a circuit that generates a finger detection signal FDS for detecting a finger, under the control of the MCU 50. The finger detection signal FDS is formed of K pulse trains each including K pulses (data representing "1" or "−1"), for example. K is equal to the number of the sensor electrodes 21Y. Further, the K pulse trains include different contents (i.e., combination of the K pulses).

The transmission unit 53 is a circuit that generates an uplink signal US on the basis of a command COM supplied from the MCU 50 and a control signal ctrl_t transmitted from the logic unit 51. Specifically, the transmission unit 53 generates an uplink signal US by adding a predetermined preamble to the head of a command COM supplied from the MCU 50, spreading the resultant symbol train with a predetermined spread code (e.g., an 11-chip length spread code having an autocorrelation characteristic), and further modulating the train through a cyclic shift, for example.

The selection unit 55 includes a switch 56 and conductor selecting circuits 57x and 57y.

The switch 56 is a switch element that is configured to connect a common terminal to any one of a T1 terminal, a T2 terminal, a D terminal, and an R terminal. The T2 terminal is actually a set of terminals as many as the sensor electrodes 21Y. The common terminal in the switch 56 is connected to the conductor selecting circuit 57y. The T1 terminal is connected to an output end of the transmission unit 53. The T2 terminal is connected to an output end of the transmission unit 52. The D terminal is connected to an output end of the MCU 50 from which the common potential Vcom is outputted. The R terminal is connected to an input end of the reception unit 54.

The conductor selecting circuit 57x is a switch element for selectively connecting the plurality of sensor electrodes 21X to the input end of the reception unit 54. The conductor selecting circuit 57x is configured to be able to connect at least one or all of the sensor electrodes 21X simultaneously to the input end of the reception unit 54.

The conductor selecting circuit 57y is a switch element for selectively connecting the plurality of sensor electrodes 21Y to the common terminal of the switch 56. The conductor selecting circuit 57y is configured to be able to connect at least one or all of the sensor electrodes 21Y simultaneously to the common terminal of the switch 56. In addition, when the T2 terminal and the common terminal are connected in the switch 56, the conductor selecting circuit 57y connects the terminals constituting the T2 terminal and the sensor electrodes 21Y in one-to-one relation.

Three control signals sTR, selX, and selY are supplied from the logic unit 51 to the selection unit 55. Specifically, the control signal sTR, the control signal selX, and the control signal selY are supplied to the switch 56, the conductor selecting circuit 57x, and the conductor selecting circuit 57y, respectively. By controlling the selection unit 55 with use of the control signals sTR, selX, and selY, the logic unit 51 performs transmission of an uplink signal US or a finger detection signal FDS, application of a common potential Vcom, and reception of a downlink signal DS or a finger detection signal FDS.

To transmit uplink signals US, the logic unit 51 controls the selection unit 55 to simultaneously connect all the sensor electrodes 21Y to the input end of the transmission unit 53. As a result, uplink signals US are transmitted from the entirety of the touch surface 2a.

To receive a downlink signal DS, the logic unit 51 performs control in different ways, in a case (global scanning) of receiving a downlink signal DS in order to detect an undetected stylus S, and in a case (local scanning) of receiving a downlink signal DS from a detected stylus S. A specific explanation thereof will be given herein. First, in the case of conducting global scanning, the logic unit 51 controls the selection unit 55 to connect sequentially all the sensor electrodes 21X and 21Y to the input end of the reception unit 54. Next, in the case of conducting local scanning, at a time of receiving a tone signal T, the logic unit 51 controls the selection unit 55 to sequentially connect a few sensor electrodes 21X and 21Y that are located around a position pointed to by the stylus S to the input end of the reception unit 54. Next, at a time of receiving a data signal D, the logic unit 51 controls the selection unit 55 to connect the sensor electrode 21X or sensor electrode 21Y that is closest to the position pointed to by the stylus S, to the input end of the reception unit 54.

In the case of transmitting and receiving a finger detection signal FDS, the logic unit 51 controls the selection unit 55 to connect the terminals constituting the T2 terminal of the switch 56 to the sensor electrodes 21Y in one-to-one relation. Then, while maintaining this state, the logic unit 51 controls the selection unit 55 to sequentially select the plurality of sensor electrodes 21X one by one, and connect the selected sensor electrodes 21X to the reception unit 54.

As can be understood from the abovementioned controls by the logic unit 51, communication with the stylus S and detection of a position pointed to by a finger are performed by time division. The following explanation focuses on communication with the stylus S only. However, actual communication with the stylus S is carried out in between intervening operations of detecting a position pointed to by a finger.

In a case of applying a common potential Vcom, the logic unit 51 controls the selection unit 55 to simultaneously connect all the sensor electrodes 21Y to the D terminal of the switch 56. As a result, the potential of each of the sensor electrodes 21Y becomes equal to the common potential Vcom.

The reception unit 54 is a circuit that receives, on the basis of the control signal ctrl_r from the logic unit 51, a finger detection signal FDS transmitted from the transmission unit 52 and a downlink signal DS transmitted from the stylus S. At a timing of receiving the finger detection signal FDS, the reception unit 54 acquires K current values for the respective sensor electrodes 21X, and calculates, for each of the abovementioned K pulse trains, an inner product of K pulses constituting the pulse train and the acquired K current values, thereby calculating a detection level at each of intersections between the sensor electrodes 21X and the sensor electrodes 21Y. Then, on the basis of the result of the calculation, the reception unit 54 determines a touched region (touch region) of the touch surface 2a and outputs the region to the host processor 22 via the MCU 50.

At a timing of receiving the downlink signal DS, the reception unit 54 derives a position pointed to by the stylus S on the basis of the reception intensities of tone signals T at the sensor electrodes 21X and 21Y, and acquires data transmitted from the stylus S by demodulating a detected data signal D. Then, the reception unit 54 outputs the derived pointed position and the acquired data to the host processor 22 via the MCU 50.

The counter 58 is connected to the MCU 50 and stores an elapsed time from a reset time point. The MCU 50 is configured to, upon receiving a downlink signal DS, reset the counter 58. Accordingly, the elapsed time recorded in the counter 58 represents a time elapsed from the reception time of the last downlink signal DS at the MCU 50.

Figure 3A:
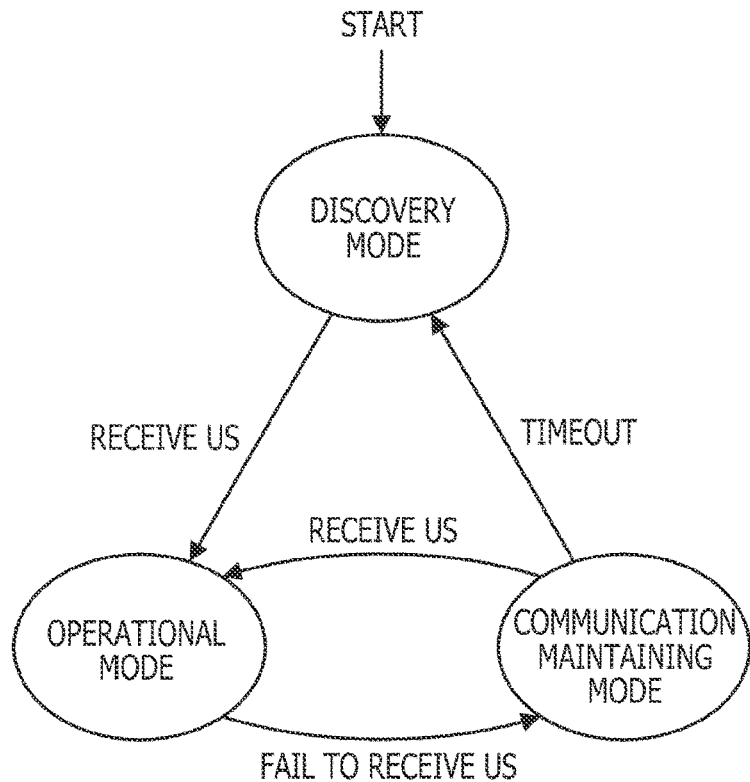
FIG. 3A is a mode transition diagram illustrating operation modes of the stylus.
Figure 3B:
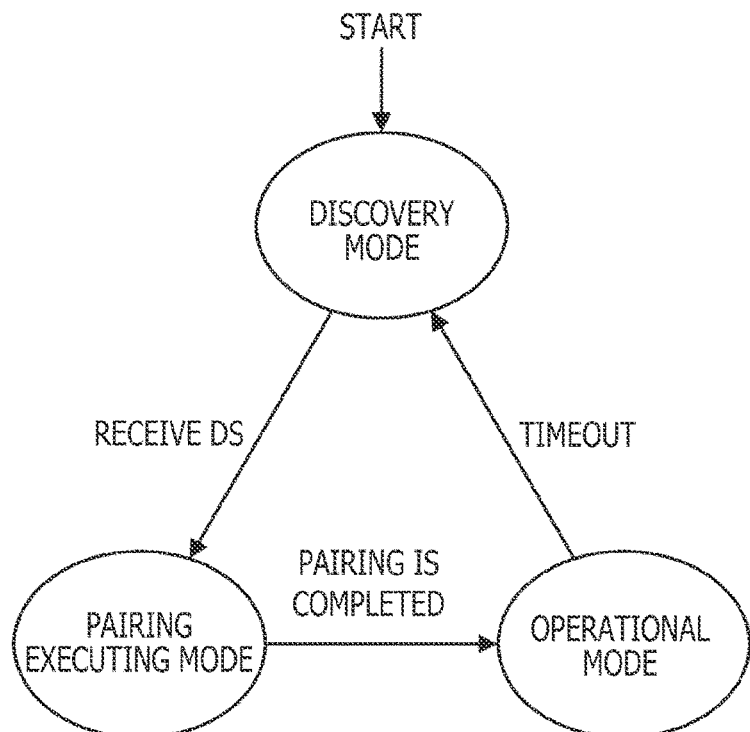
FIG. 3B is a mode transition diagram illustrating operation modes of the sensor controller.

FIG. 3A is a mode transition diagram illustrating the operation modes of a stylus S. FIG. 3B is a mode transition diagram illustrating the operation modes of the sensor controller 20.

First, attention is given to FIG. 3A. The stylus S is configured to operate in any one of a discovery mode, an operational mode, and a communication maintaining mode. The discovery mode is a mode in which only reception of an uplink signal US is continuously or intermittently conducted. After receiving an uplink signal US in the discovery mode, the stylus S is shifted to the operational mode.

The operational mode is a mode in which transmission of a downlink signal DS and reception of a next uplink signal US are conducted on the basis of a transmission and reception schedule determined on the basis of an uplink signal US received so far. After failing to receive an uplink signal US in the operational mode (i.e., conducting an uplink signal US receiving operation but failing to receive any uplink signal US), the stylus S is shifted to the communication maintaining mode.

The communication maintaining mode is a mode in which communication with the sensor controller 20 is maintained for a while even when reception of an uplink signal US fails. The details of specific operation of the stylus S in the communication maintaining mode will be described later. When no uplink signal US has been received but the communication maintaining mode times out, the stylus S is shifted to the discovery mode. On the other hand, when an uplink signal US is received in the communication maintaining mode, the stylus S returns to the operational mode.

Next, attention is given to FIG. 3B. The sensor controller 20 is configured to operate in any one of a discovery mode, a pairing executing mode, and an operational mode. In any mode, the sensor controller 20 performs an uplink signal US transmitting operation in a fixed cycle and performs a downlink signal DS receiving operation during an interval between the cycles. The uplink signal US transmission cycle may be formed of the one frame described above, for example.

The discovery mode is a mode in which pairing with the stylus S has not been established, and in which the sensor controller 20 conducts the abovementioned global scanning. An uplink signal US that is transmitted in the discovery mode includes information that specifies a set of information relating to a transmission and reception schedule, and allocation of time slots and a frequency. After receiving the uplink signal US, the stylus S determines a transmission and reception schedule for a downlink signal DS and an uplink signal US, and transmits a tone signal T in each allocated time slot. After receiving a downlink signal DS in the discovery mode, the sensor controller 20 is shifted to the pairing executing mode.

The pairing executing mode is a mode in which pairing is established with the stylus S from which the downlink signal DS has been transmitted. The sensor controller 20, upon entering the pairing executing mode, first conducts global scanning to detect a position pointed to by the stylus S, and then, conducts local scanning. During this local scanning, the sensor controller 20 transmits an uplink signal US that includes an instruction to transmit a pen ID. Upon receiving the uplink signal US, the stylus S sequentially transmits a tone signal T, the pen ID, and a data signal D, by using the time slots and the frequency allocated by the previous uplink signal US. By demodulating the received data signal D, the sensor controller 20 acquires the pen ID and stores the pen ID in the internal memory so as to establish pairing with the stylus S. Then, the sensor controller 20 is shifted to the operational mode. In addition, the sensor controller 20 derives the position pointed to by the stylus S on the basis of the reception result of the tone signal T and outputs the derived position and the acquired pen ID to the host processor 22.

The operational mode is a mode in which local scanning is repeatedly conducted. The sensor controller 20, upon entering the operational mode, derives a position pointed to by the stylus S on the basis of the reception result of a tone signal T that is received after transmission of an uplink signal US, acquires data transmitted from the stylus S by demodulating the next received data signal D, and sequentially outputs the derived point position and the acquired data to the host processor 22. Moreover, when the elapsed time recorded in the counter 58 exceeds a predetermined period of time, the sensor controller 20 cancels the pairing with the stylus S, and is shifted to the discovery mode.

Next, operations of the stylus S and the sensor controller 20 according to the present embodiment will be explained in more detail with reference to sequence diagrams in FIGS. 4 to 7.

Figure 4:
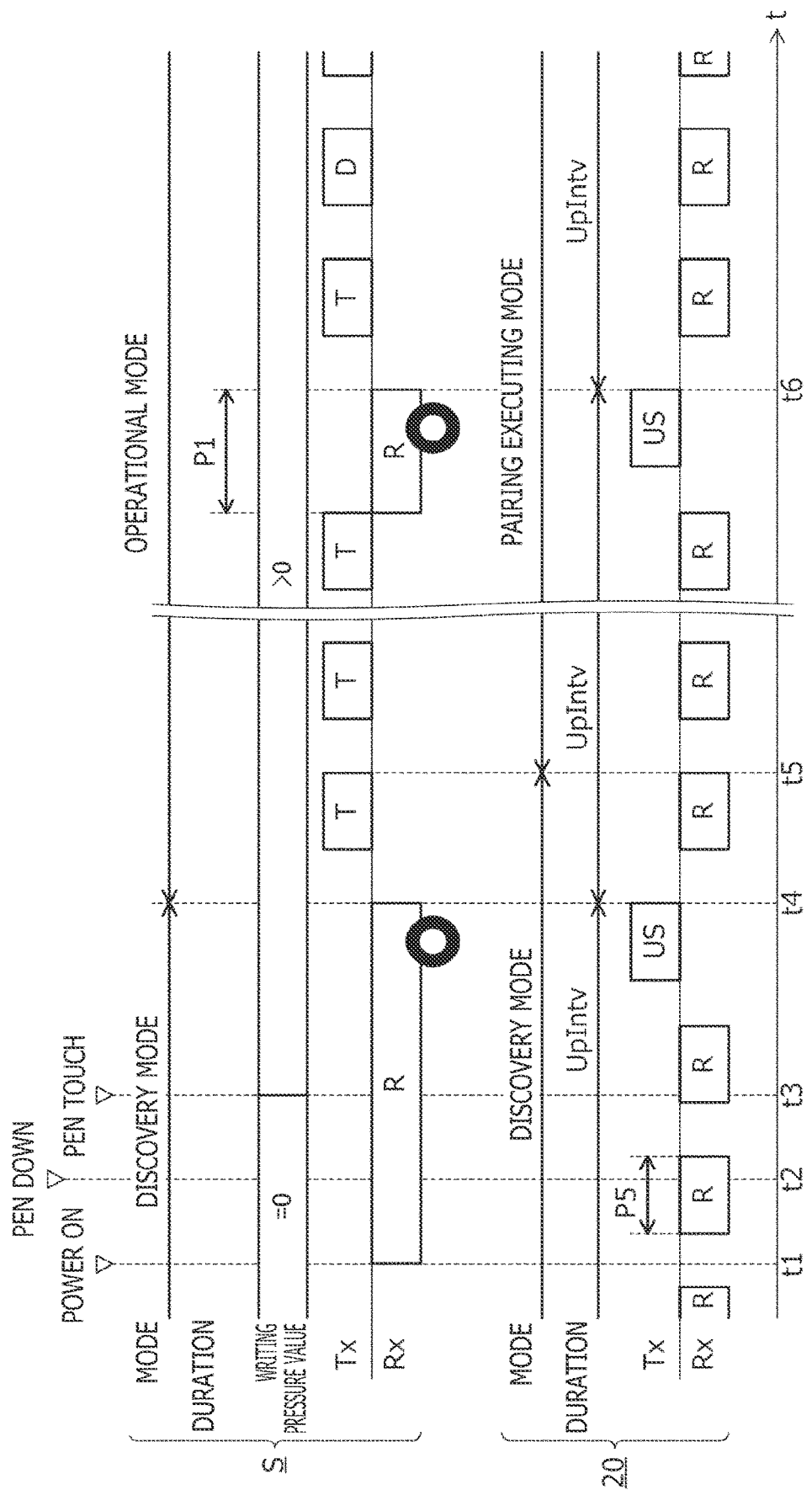
FIG. 4 is a sequence diagram of operations of the stylus and the sensor controller in a case where the stylus newly approaches a touch surface.

First, FIG. 4 is a sequence diagram of operations of the stylus S and the sensor controller 20 in a case where the stylus S newly approaches the touch surface 2a. In this example, the stylus S is powered on at time t1, a pen down (a state in which the stylus S becomes communicable with the sensor controller 20) is conducted at time t2, and a pen touch (a state in which the pen point of the stylus S is brought into contact with the touch surface 2a) is conducted at time t3.

The sensor controller 20 is configured to first transmit an uplink signal US in a predetermined cycle UpIntv, and to receive a downlink signal DS during an uplink signal US transmission interval. It is to be noted that reception periods each having a time length P5 and being denoted by "R" in FIG. 4 correspond to the abovementioned time slots. Since the sensor controller 20 is in the discovery mode in these time slots, the first uplink signal US in FIG. 4 includes information that specifies a set of information relating to a transmission and reception schedule and allocation of time slots and a frequency.

After being powered on, the stylus S continuously or intermittently executes the uplink signal US receiving operation. Then, after entering a pen down state at time t2, the stylus S becomes able to receive an uplink signal US. In FIG. 4, the stylus S receives an uplink signal US at time t4. It is to be noted that, in FIG. 4 and the following drawings, thick circles each indicate that the stylus S successfully receives an uplink signal US. Further, after the stylus S enters a pen touch state at time t3, a writing pressure value which is detected by the pressure sensor 34 becomes a value greater than 0.

After receiving the uplink signal US at time t4, the stylus S determines a transmission and reception schedule for a downlink signal DS and the next uplink signal US on the basis of the reception timing of the uplink signal US and information included in the uplink signal US. The determined transmission and reception schedule indicates that a tone signal T is transmitted in each time slot, and further, the next uplink signal US receiving operation is executed using the last predetermined period of time P1 of one cycle, as illustrated in FIG. 4. The predetermined period of time P1 may be equal to the predetermined period of time P5, or may be longer than the predetermined period of time P5, as illustrated in FIG. 4. After determining the transmission and reception schedule, the stylus S makes an entry into the operational mode.

After receiving, at time t5, a tone signal T first transmitted from the stylus S according to the transmission and reception schedule, the sensor controller 20 makes an entry into the pairing executing mode and conducts global scanning additionally using subsequently received tone signals T. As a result, the sensor controller 20 derives the initial position of the stylus S. Thereafter, the sensor controller 20 transmits an uplink signal US that includes a command including an instruction to transmit the pen ID.

After receiving the uplink signal US at time t6, the stylus S updates the transmission and reception schedule for a downlink signal DS and the next uplink signal US on the basis of the reception timing of the uplink signal US and information included in the uplink signal US. The updated transmission and reception schedule indicates that a tone signal T is first transmitted, and then, a data signal D is transmitted, and the next uplink signal US receiving operation is executed by using the last predetermined period of time P1 in one cycle, as illustrated in FIG. 4.

The sensor controller 20 derives the position of the stylus S by conducting local scanning using the tone signal T transmitted from the stylus S. Next, the sensor controller 20 acquires the pen ID transmitted from the stylus S by demodulating a data signal D transmitted from the stylus S, and stores the pen ID in the internal memory. As a result, the sensor controller 20 establishes pairing and is shifted to the operational mode.

Figure 5:
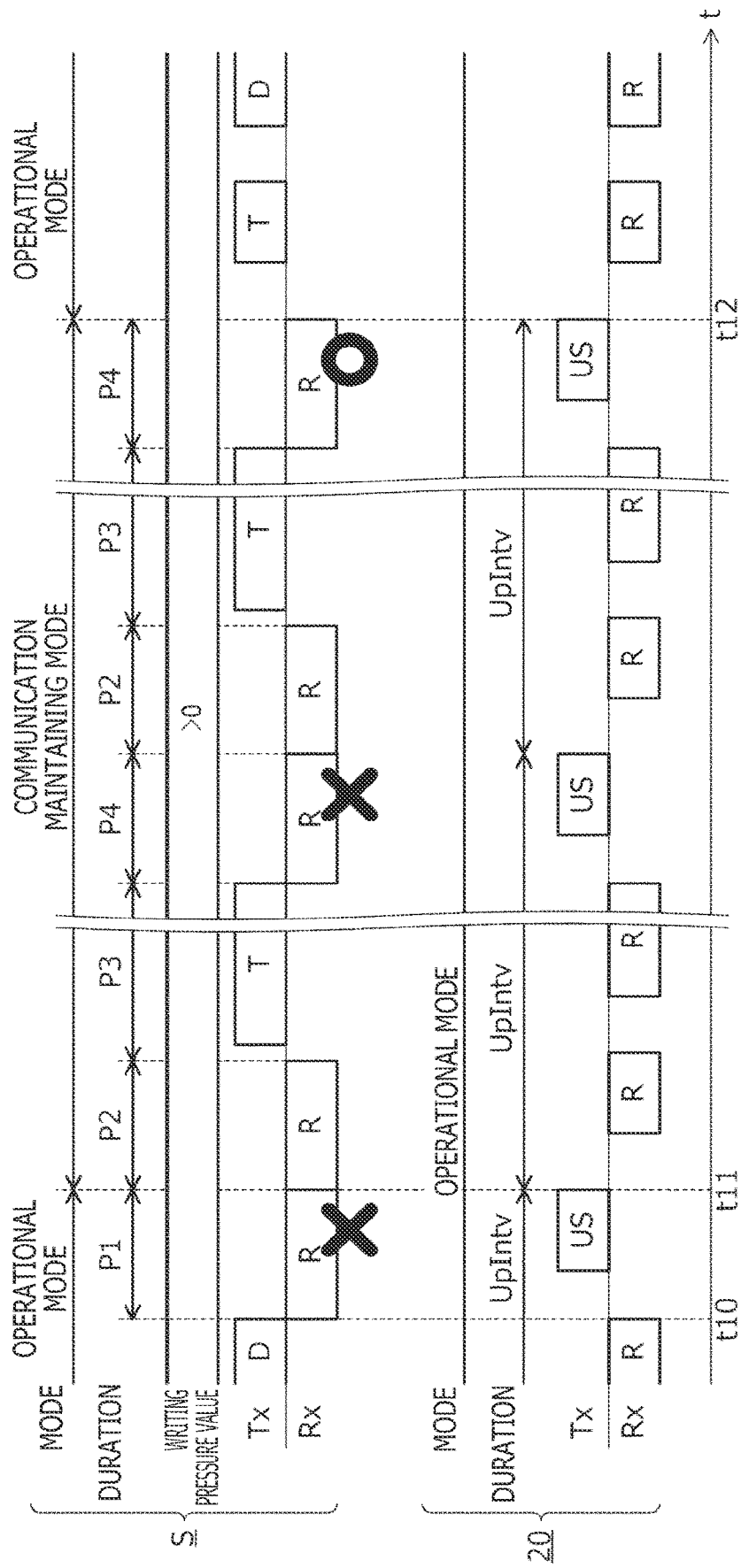
FIG. 5 is a sequence diagram of operations of the stylus and the sensor controller in a case where the stylus fails to receive an uplink signal when both the stylus and the sensor controller are in an operational mode.

FIG. 5 is a sequence diagram of operations of the stylus S and the sensor controller 20 in a case where the stylus S fails to receive an uplink signal US when both the stylus S and the sensor controller 20 are in the operational mode. In FIG. 5 and the following drawings, thick x marks each indicate that the stylus S fails to receive an uplink signal US. In this example, the stylus S starts an uplink signal US receiving operation at time t10 according to the transmission and reception schedule, but has received no uplink signal US before time t11 at which the predetermined period of time P1 has elapsed.

In this case, the stylus S makes an entry into the communication maintaining mode and continues the uplink signal US receiving operation for a predetermined period of time P2 that follows the predetermined period of time P1. The time length of the predetermined period of time P2 is not limited to a particular time length, but may be preferably set to be ¼ of the cycle UpIntv, for example. Accordingly, even in a case where the uplink signal US receiving operation is shifted forward for some reason, reception of an uplink signal US is possible. Therefore, the possibility that the stylus S may fail to receive an uplink signal US can be reduced.

Next, the stylus S continuously transmits a tone signal T for a predetermined period of time P3 before a timing of starting the next uplink signal US receiving operation (i.e., a timing between the end of the cycle UpIntv and the start of the predetermined period of time P1) according to the transmission and reception schedule, irrespective of the content of an uplink signal US that the stylus S has failed to receive. The time length of the predetermined period of time P3 is also not limited to a particular length, but may be preferably set to be ½ of the cycle UpIntv, for example.

Here, the sensor controller 20 is configured to reset the counter 58 illustrated in FIG. 2 not only in a case where the content of the downlink signal DS received from the stylus S is consistent with the request issued through the uplink signal US, but also in a case where the content of the downlink signal DS received from the stylus S is inconsistent with the request issued through the uplink signal US. Accordingly, even when the stylus S is in the communication maintaining mode, the operational mode is maintained as the mode of the sensor controller 20 as long as a tone signal T from the stylus S arrives at the sensor controller 20. Further, the sensor controller 20 is configured to derive the position of the stylus S by using a downlink signal DS received from the stylus S, even in a case where the content of the downlink signal DS is inconsistent with the request issued through the uplink signal US. Accordingly, the sensor controller 20 continuously derives the position of the stylus S as long as a tone signal T from the stylus S arrives.

After completing transmission of the tone signal T, the stylus S executes an uplink signal US receiving operation for a predetermined period of time P4. The time length of the predetermined period of time P4 may be set to a value obtained by subtracting a total value of the predetermined period of time P2 and the predetermined period of time P3 from the cycle UpIntv. In one example, when the predetermined period of time P2 and the predetermined period of time P3 are set to be ¼ of the cycle UpIntv and ½ of the cycle UpIntv, respectively, as explained above, the predetermined period of time P4 may be set to ¼ of the cycle UpIntv. It is to be noted that the predetermined period of time P4 may be set to be longer than the predetermined period of time P1. In this case, the stylus S starts the uplink signal US receiving operation prior to the timing of starting the uplink signal US receiving operation determined according to the transmission and reception schedule.

When performing the receiving operation for the predetermined period of time P4 but having received no uplink signal US, the stylus S repeats the abovementioned operations from the uplink signal US receiving operation for the predetermined period of time P2. In this case, the uplink signal US receiving operation for the predetermined period of time P2 is executed so as to follow the uplink signal US receiving operation for the immediately preceding predetermined period of time P4.

In the example in FIG. 5, the stylus S successfully receives an uplink signal US at time t12. In response to this, the stylus S updates the transmission and reception schedule and returns to the operational mode.

Figure 6:
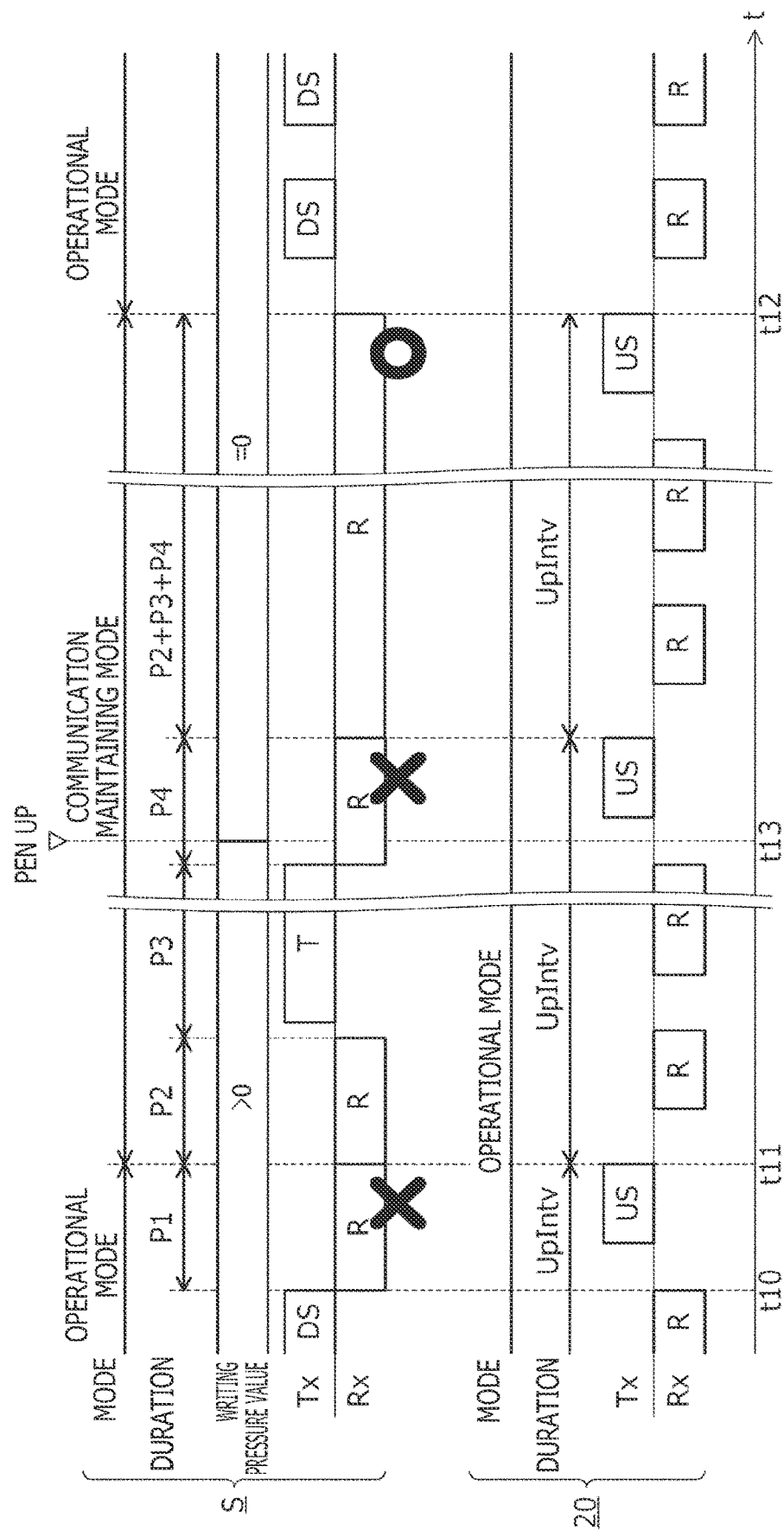
FIG. 6 is a sequence diagram of operations of the stylus and the sensor controller in a case where the stylus fails to receive an uplink signal when both the stylus and the sensor controller are in an operational mode.

FIG. 6 is a sequence diagram of operations of the stylus S and the sensor controller 20 in a case where the stylus S fails to receive an uplink signal US when both the stylus S and the sensor controller 20 are in the operational mode, as in FIG. 5. The example in FIG. 6 differs from that in FIG. 5 in that, in FIG. 6, a pen up occurs at time t13 when the stylus S is in the communication maintaining mode.

The stylus S is configured to, after entering the communication maintaining mode, perform an uplink signal US receiving operation, instead of a tone signal T transmitting operation, in a case where the writing pressure value detected by the pressure sensor 34 indicates that the pen point is not in contact with the touch surface 2a. As a result, transmission of a tone signal T is not performed by the stylus S, but the uplink signal US receiving operation is continuously performed after time t13 in FIG. 6. Accordingly, the sensor controller 20 discontinues the operation of deriving the position of the stylus S and returns to the discovery mode at an early stage, but the pen-up state of the stylus S means that writing is not being executed so it is unlikely that the user will experience any inconvenience. Also, the period of time of the uplink signal US receiving operation becomes long, compared to a case where transmission of a tone signal T is performed, and thus, it is more likely that an uplink signal US is successfully received.

Figure 7:
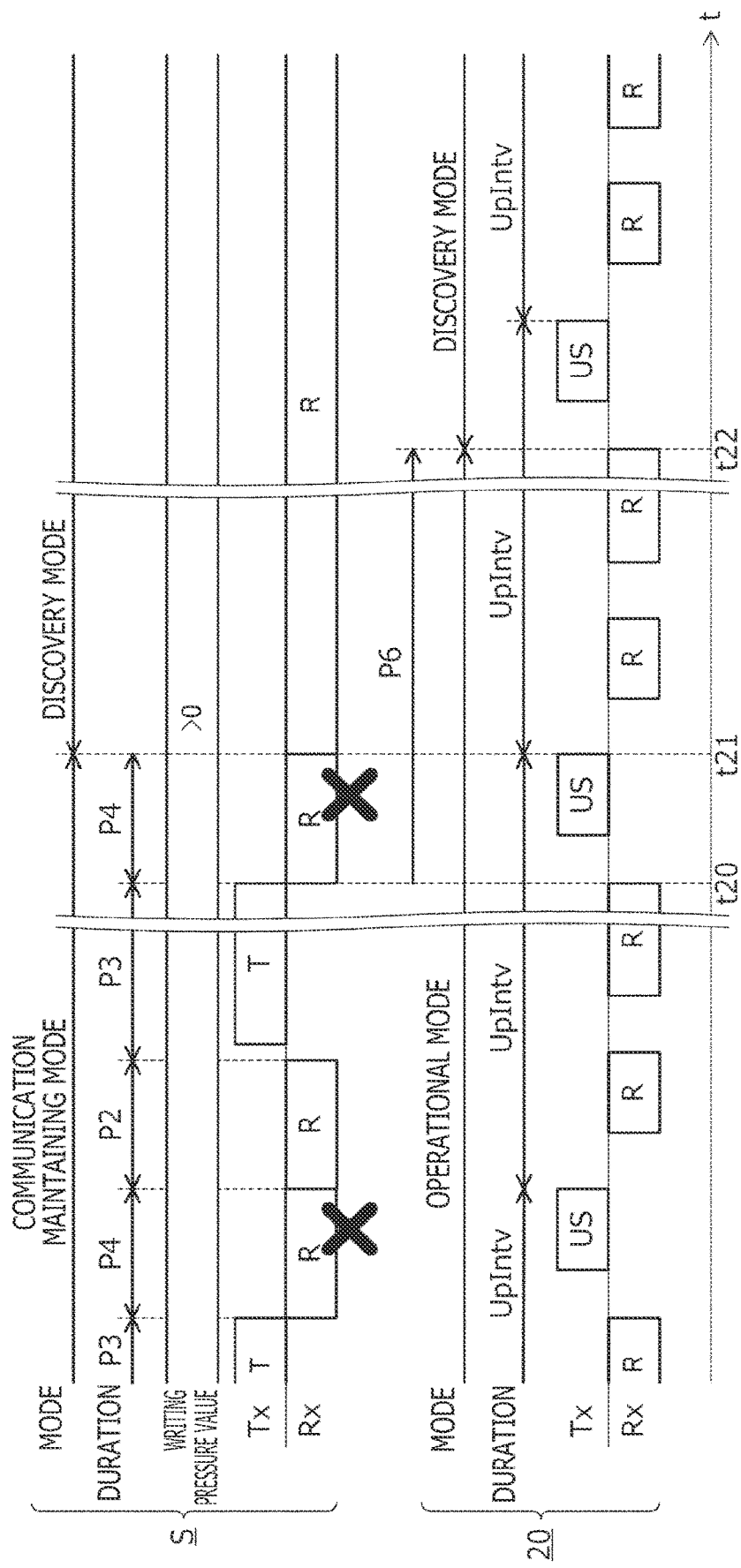
FIG. 7 is a sequence diagram of operations of the stylus and the sensor controller in a case where processing in a communication maintaining mode is executed by the stylus but the stylus S fails to receive an uplink signal.

FIG. 7 is a sequence diagram of operations of the stylus S and the sensor controller 20 in a case where the stylus S executes processing of the communication maintaining mode but fails to receive an uplink signal US. The stylus S is shifted to the discovery mode at time t21 when the number of times a series of processing in the communication maintaining mode is executed (the uplink signal US receiving operation for the predetermined period of time P2, the tone signal T transmitting operation for the predetermined period of time P3, and the uplink signal US receiving operation for the predetermined period of time P4) reaches a predetermined time while no uplink signal US has been received. Then, the processing of the communication maintaining mode is terminated. In addition, the sensor controller 20 resets the counter 58 illustrated in FIG. 2 at time t20 when the last tone signal T is received. Thereafter, at time t22 when the elapsed time recorded in the counter 58 exceeds a predetermined period of time P6, the sensor controller 20 cancels pairing with the stylus S, and returns to the discovery mode.

Next, operations of the stylus S and the sensor controller 20 according to the present embodiment will be explained in more detail with reference to process flowcharts illustrated in FIGS. 8 to 13.

FIGS. 8 to 11 are flow diagrams each illustrating a process flow in the stylus S. FIGS. 8 to 11 each illustrate a process which is executed by the processing circuit 30 illustrated in FIG. 1.

Figure 8:
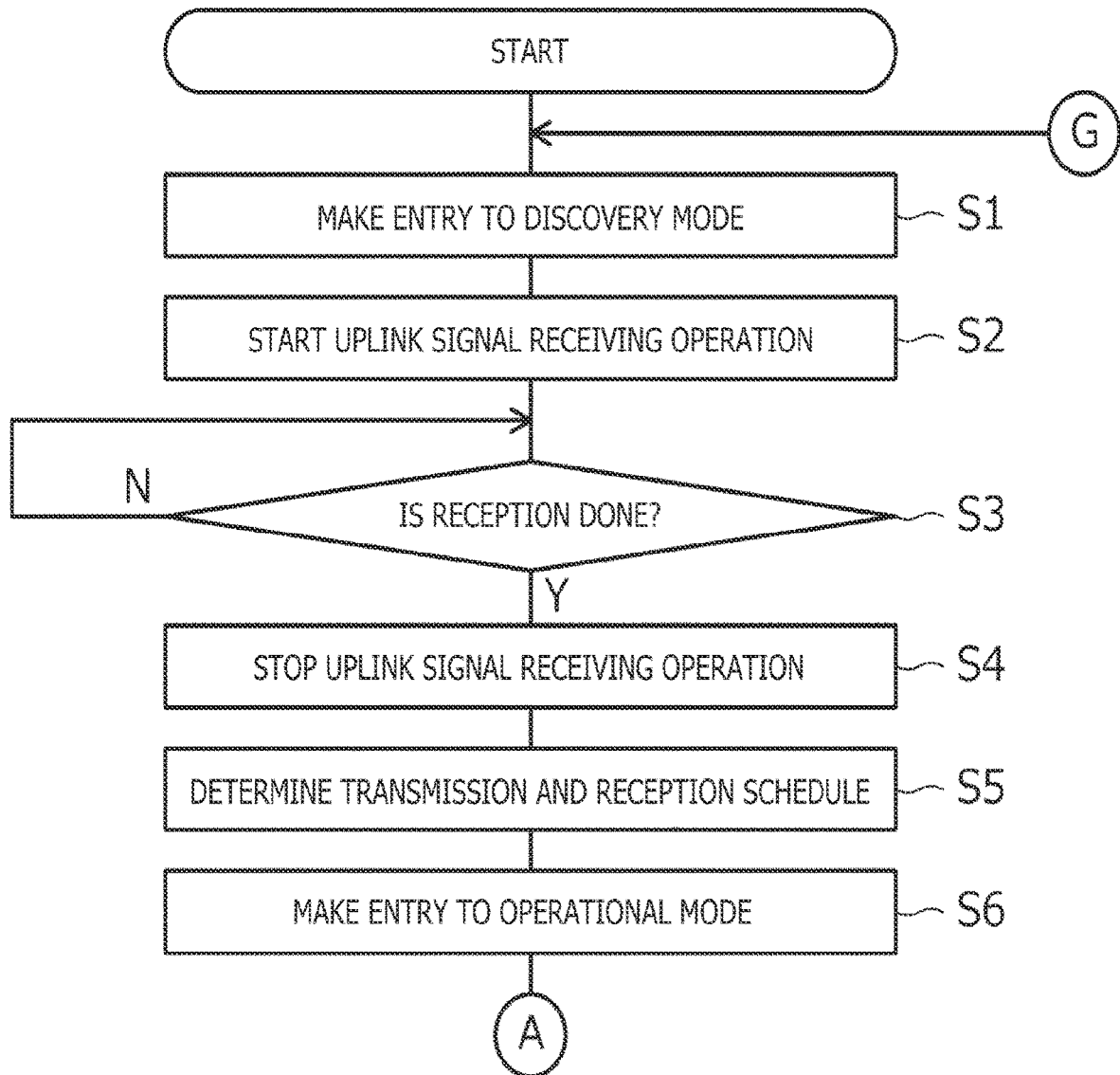
FIG. 8 is a process flowchart illustrating a process flow in the stylus.

With reference to FIG. 8 first, the powered-on stylus S makes an entry into the discovery mode (step S1), and starts an uplink signal US receiving operation (step S2). Then, whether or not an uplink signal US is received in the receiving operation is determined (step S3). The stylus S repeats step S3 until reception of an uplink signal US is determined. When the reception is determined, the uplink signal US receiving operation is stopped (step S4). It is to be noted that the stylus S may continuously execute the uplink signal US receiving operation which is started in step S2, or may intermittently execute the receiving operation. In this case, in order to ensure reception of an uplink signal US when the stylus S enters a signal-receivable area, it is preferable to set the duration of one receiving operation to be longer than the abovementioned cycle UpIntv.

Next, on the basis of the repletion timing of the uplink signal US and information included in the uplink signal US, the stylus S having received the uplink signal US determines a transmission and reception schedule for a downlink signal DS and the next uplink signal US (step S5). Then, the stylus S enters the operational mode (step S6).

Figure 9:
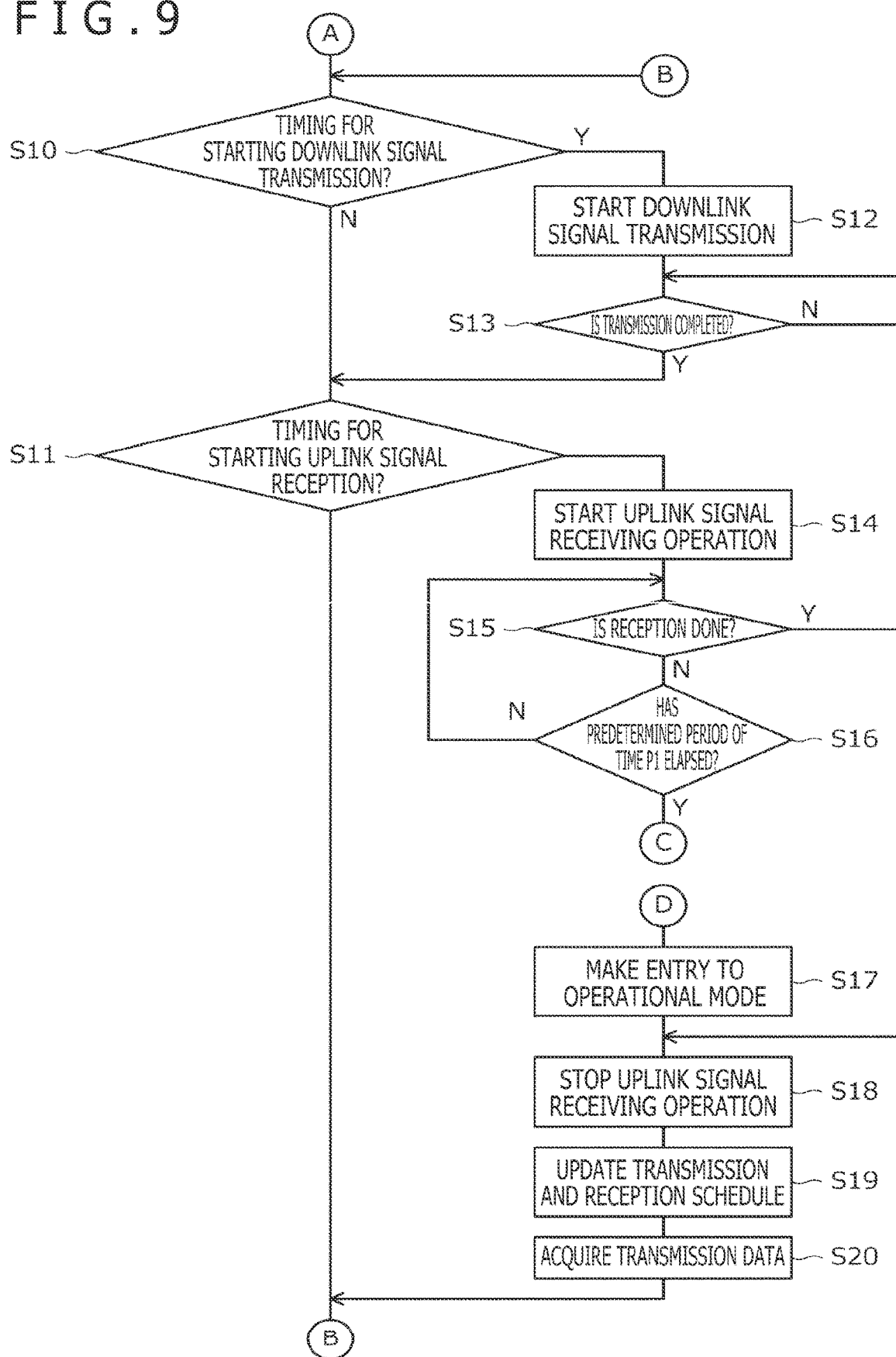
FIG. 9 is a process flowchart illustrating a process flow in the stylus.

According to the determined transmission and reception schedule, the stylus S in the operational mode intermittently determines whether or not a timing of transmitting a downlink signal DS has arrived (step S10), and whether or not a timing of receiving an uplink signal US has arrived (step S11), as illustrated in FIG. 9.

After determining, in step S10, that the timing of transmitting a downlink signal DS has arrived, the stylus S starts transmission of a downlink signal DS including content consistent with the indication in the uplink signal US (step S12). A downlink signal DS that is transmitted in this manner is the abovementioned tone signal T or data signal D. The time length of this signal is previously adjusted such that the transmission is completed within a period of time (i.e., the abovementioned time slot) indicated by the transmission and reception schedule. Subsequently, the stylus S determines whether or not transmission of the downlink signal DS is completed (step S13). When the completion is determined, the process returns to the determinations in steps S10 and S11.

When determining, in step S11, that the timing of receiving an uplink signal US has arrived, the stylus S starts an uplink signal US receiving operation (step S14). Then, the stylus S determines whether or not an uplink signal US is received (step S15). When determining that the reception is not done, the stylus S determines whether or not the predetermined period of time P1 has elapsed from the start of the receiving operation (step S16). When it is determined that the predetermined period of time P1 has not elapsed, the process returns to step S15 to continue the determination process. When it is determined that the predetermined period of time P1 has elapsed, the process proceeds to step 30 in FIG. 10.

After determining, in step S15, that the uplink signal US is received, the stylus S stops the uplink signal US receiving operation (step S18), and updates the transmission and reception schedule for a downlink signal DS and the next uplink signal US on the basis of the reception timing of the uplink signal US received here and information included in the uplink signal US (step S19). Then, the stylus S acquires transmission data in accordance with a command included in the uplink signal US (step S20), and the process returns to the determination in steps S10 and S11. The data acquired in step S20 is collectively or dividedly included in a data signal D to be transmitted in the following step S12.

Figure 10:
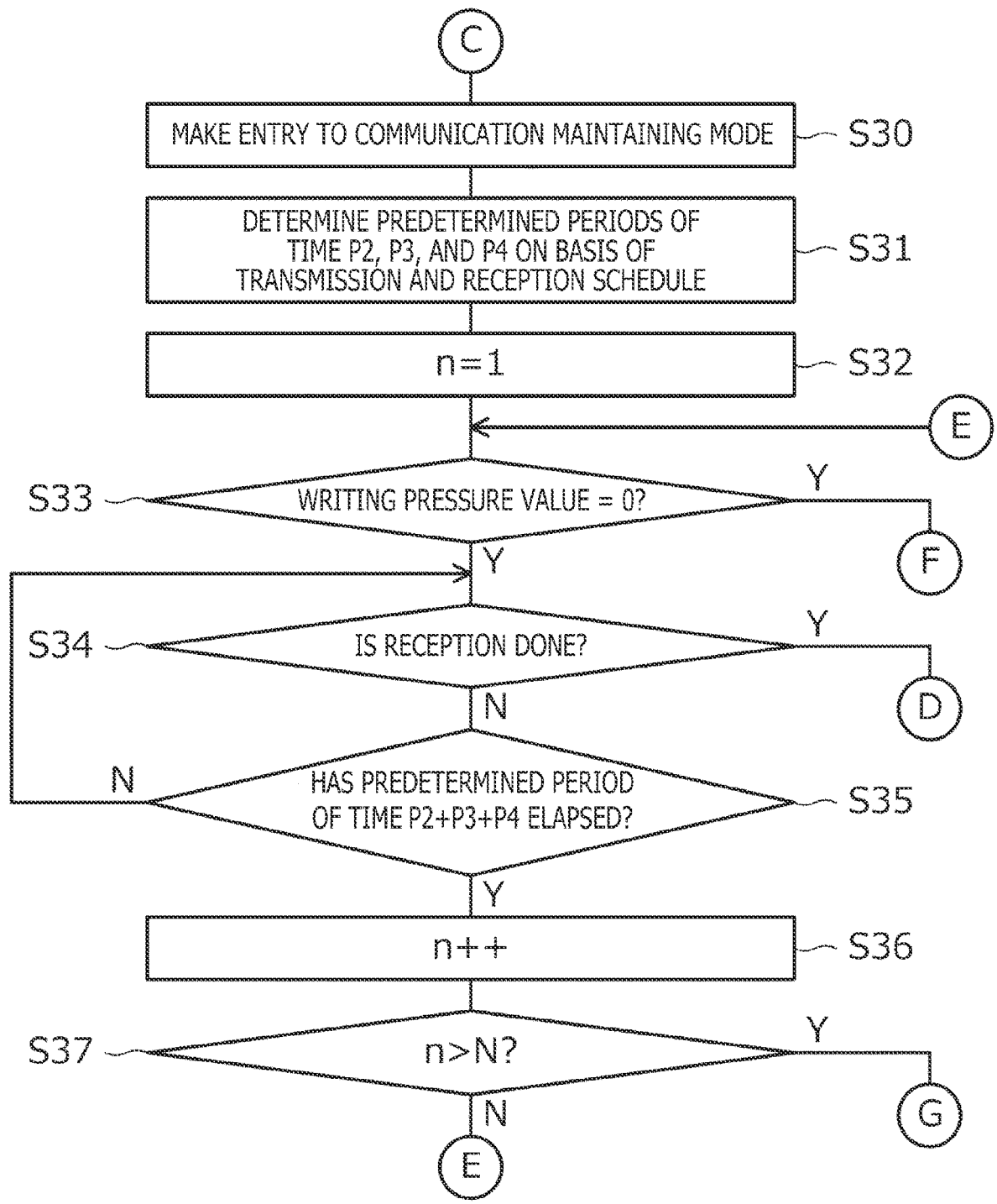
FIG. 10 is a process flowchart illustrating a process flow in the stylus.

In step S30 in FIG. 10, the stylus S enters the communication maintaining mode. Then, the stylus S determines the abovementioned predetermined periods of time P2, P3, and P4 on the basis of the latest transmission and reception schedule determined in step S5 or step S19 (step S31). In a typical case, P2=UpIntv/4, P3=UpIntv/2, and P4=UpIntv/4 may be set on the basis of the cycle UpIntv indicated by the transmission and reception schedule.

Next, the stylus S substitutes 1 for a variable n that represents the number of times the series of processing in the communication maintaining mode is executed (the uplink signal US receiving operation for the predetermined period of time P2, the tone signal T transmitting operation for the predetermined period of time P3, and the uplink signal US receiving operation for the predetermined period of time P4) (step S32), and determines whether or not the writing pressure value detected by the pressure sensor 34 is 0 (step S33).

When determining, in step S33, that the writing pressure value is 0, the stylus S repeatedly determines whether or not an uplink signal US is received, until the predetermined periods of time P2+P3+P4 elapse (steps S34 and S35). After the stylus S determines, in step S34, that an uplink signal US is received, the process proceeds to step S17 in FIG. 9. As illustrated in FIG. 9, the stylus S enters the operational mode in step S17, and the process proceeds to step S18. Thereafter, the stylus S operates in the operational mode. On the other hand, when determining, in step S35, that the predetermined periods of time P2+P3+P4 have elapsed, the stylus S increments the variable n by 1 (step S36), and compares the variable n with a predetermined value N (step S37). In a case where the result illustrates n>N, the process returns to step S1 in FIG. 8. Accordingly, the stylus S returns to the discovery mode. On the other hand, in a case where n>N is not established, the process returns to step S33 at which the stylus S continues the processing of the communication maintaining mode.

Figure 11:
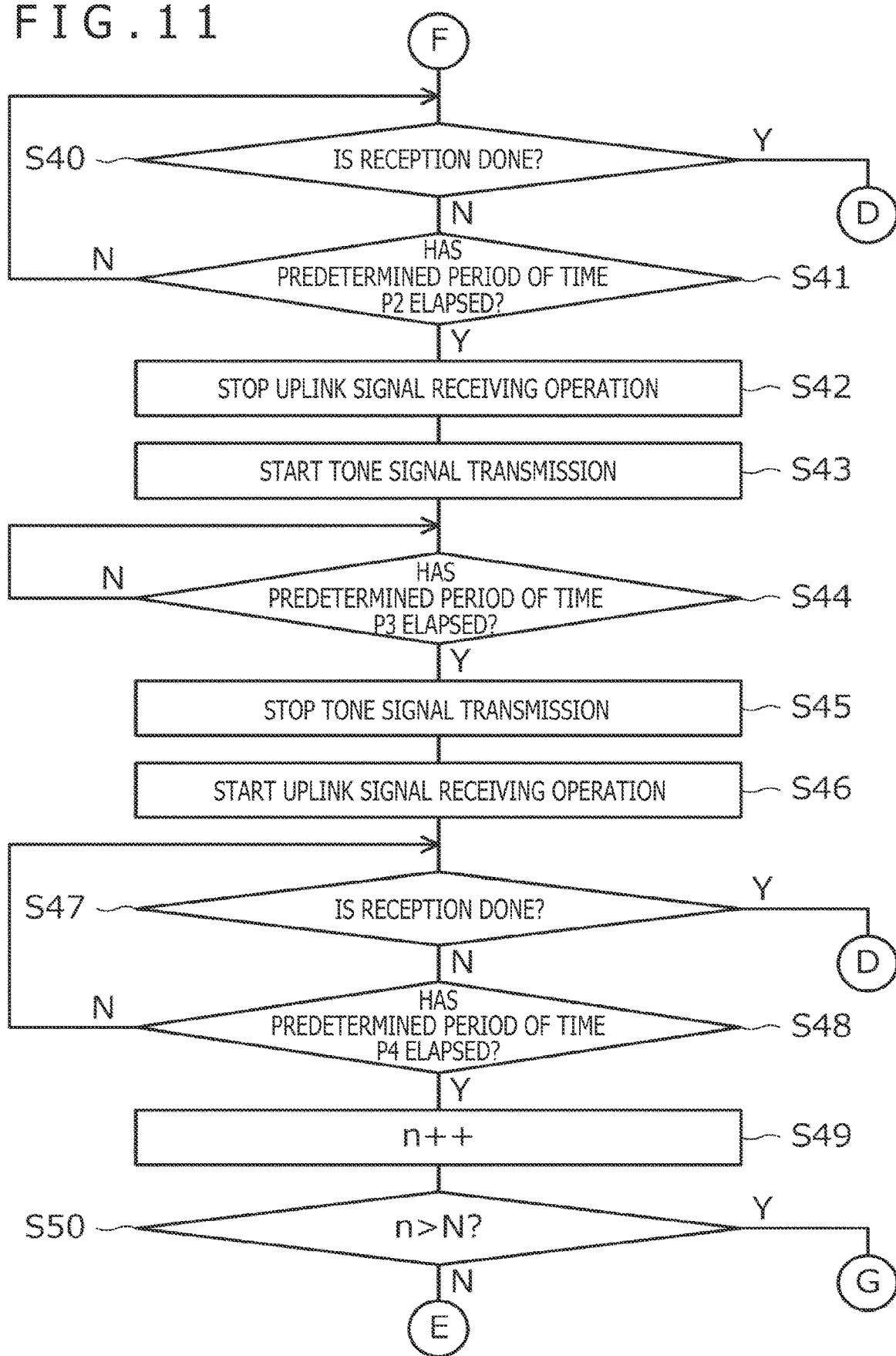
FIG. 11 is a process flowchart illustrating a process flow in the stylus.

When determining, in step S33, that the writing pressure value is not 0, the stylus S repeatedly determines whether or not an uplink signal US is received until the predetermined period of time P2 elapses (steps S40 and S41), as illustrated in FIG. 11. After the stylus S determines, in step S40, that an uplink signal US is received, the process returns to step S17 in FIG. 9. The following steps have been previously explained. On the other hand, when determining, in step S41, that the predetermined period of time P2 has elapsed, the stylus S stops the uplink signal US receiving operation (step S42), and starts transmission of a tone signal T (step S43). Subsequently, the stylus S continues the transmission of a tone signal T. When the predetermined period of time P3 has elapsed from the stop of the uplink signal US receiving operation in step S42 (step S44), the transmission of a tone signal T is stopped (step S45).

After stopping the transmission of a tone signal T, the stylus S starts an uplink signal US receiving operation again (step S46), and then, repeatedly determines whether or not an uplink signal US is received until the predetermined period of time P4 elapses (steps S47 and S48). After the stylus S determines, in step S47, that an uplink signal US is received, the process proceeds to step S17 in FIG. 9. The following steps have been previously explained. On the other hand, after determining, in step S48, that the predetermined period of time P4 has elapsed, the stylus S increments the variable n by 1 (step S49), and compares the variable n with the predetermined value N (step S50). When the result illustrates that n>N, the process returns to step S1 in FIG. 8. Accordingly, the stylus S returns to the discovery mode. On the other hand, when n>N is not established, the process returns to step S33 in FIG. 10 in which the stylus S continues the processing of the communication maintaining mode.

Figure 12:
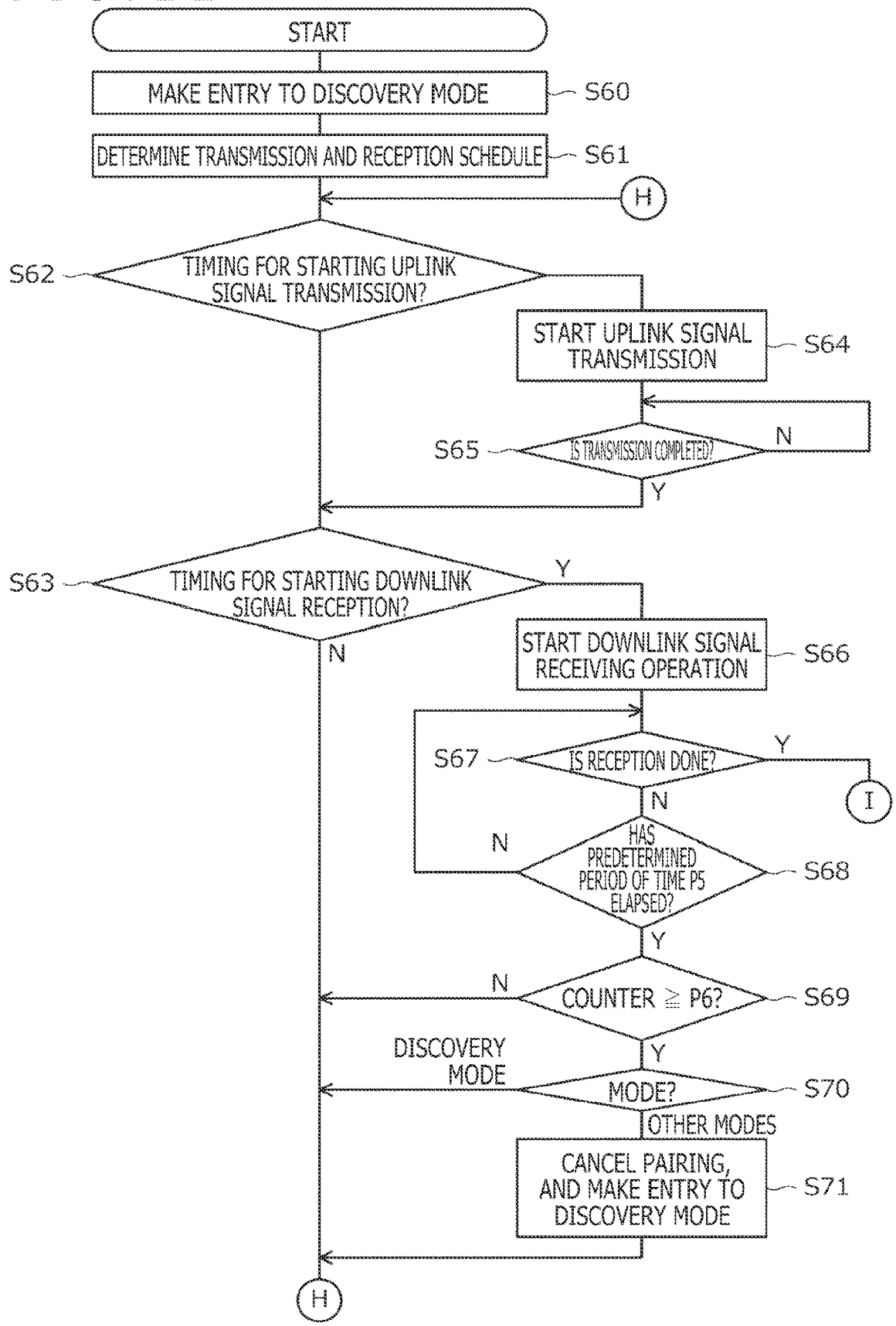
FIG. 12 is a process flowchart illustrating a process flow in the sensor controller.
Figure 13:
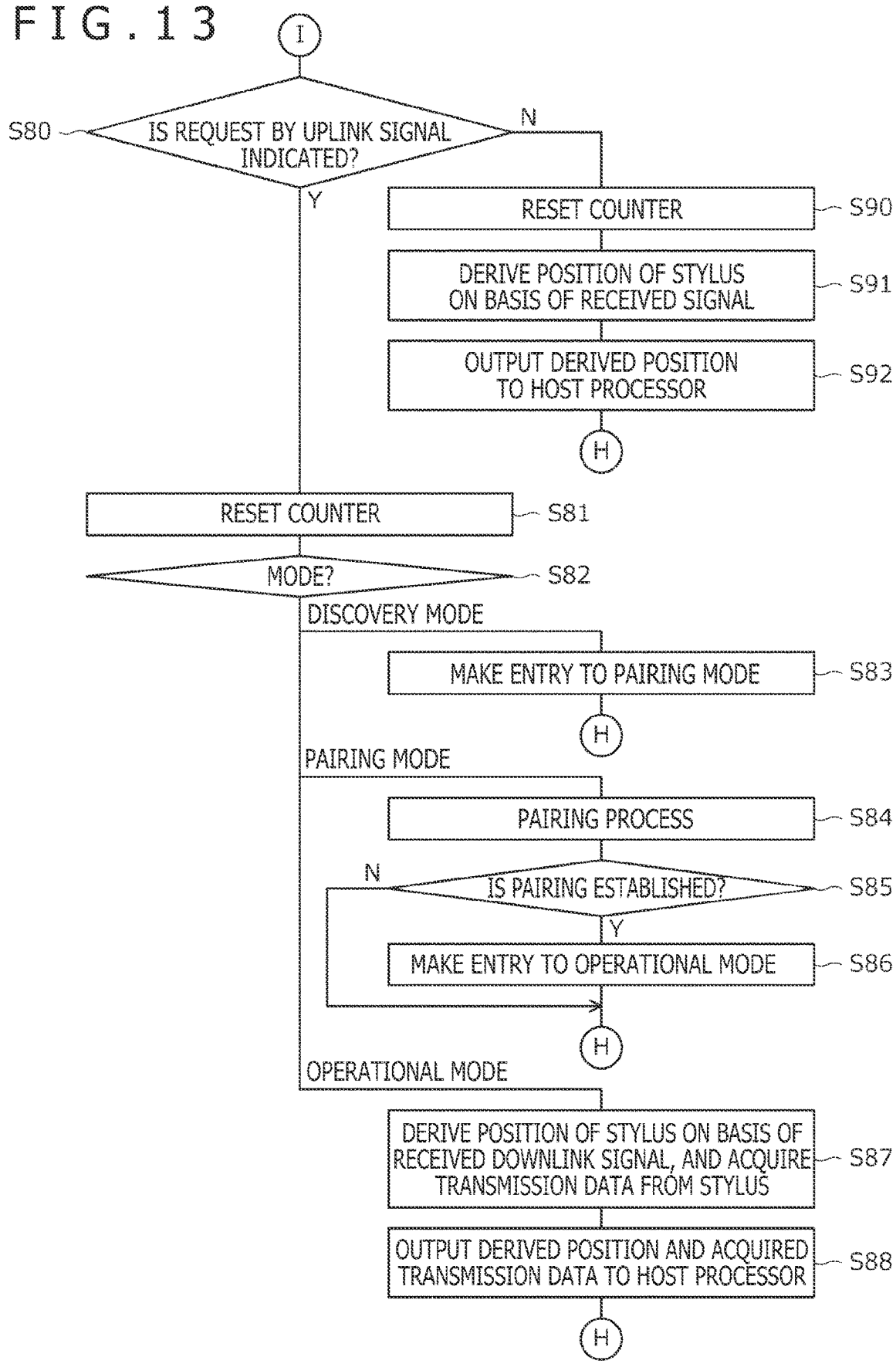
FIG. 13 is a process flowchart illustrating a process flow in the sensor controller.

Next, FIGS. 12 and 13 are process flow diagrams each illustrating a process flow in the sensor controller 20. FIGS. 12 and 13 each illustrate a process which is executed by the MCU 50 illustrated in FIG. 2.

Referring to FIG. 12 first, the powered-on sensor controller 20 enters the discovery mode (step S60), and determines a transmission and reception schedule for an uplink signal US and a downlink signal DS (step S61). This determination may be made by allocating transmission of an uplink signal US and reception of a downlink signal DS to respective time slots in one frame, for example.

Next, the sensor controller 20 continuously determines whether or not a timing of transmitting an uplink signal US has arrived (step S62), and whether or not a timing of receiving a downlink signal DS has arrived (step S63), according to the determined transmission and reception schedule.

When determining, in step S62, that the timing of transmitting an uplink signal US has arrived, the sensor controller 20 starts transmission of an uplink signal US (step S64). After the transmission of an uplink signal US is completed, the process returns to the determinations in steps S62 and S63.

When determining, in step S63, that a timing of receiving a downlink signal DS has arrived, the sensor controller 20 starts a downlink signal DS receiving operation (step S66). Then, the sensor controller 20 repeatedly determines whether or not a downlink signal DS is received until the predetermined period of time P5 that is as long as the time length of one time slot elapses (steps S67 and S68).

After the sensor controller 20 determines, in step S67, that a downlink signal DS is received, the process proceeds to step S80 in FIG. 13. After determining, in step S68, that the predetermined period of time P5 has elapsed, the sensor controller 20 determines whether or not the elapsed time indicated by the counter 58 illustrated in FIG. 2 has reached the predetermined period of time P6 (step S69). When the elapsed time has not reached the predetermined period of time P6, the process returns to the determinations in steps S62 and S63. When the elapsed time has reached the predetermined period of time P6, the current operation mode is determined (step S70). When the current operation mode is the discovery mode, the process returns to the determinations in steps S62 and S63. When the current operation mode is any one of the remaining modes, pairing is canceled if the pairing is established, and the sensor controller 20 enters the discovery mode (step S71). Then, the process returns to the determinations in steps S62 and S63.

Referring to FIG. 13, the sensor controller 20 determines, in step S80, whether or not the received downlink signal DS is consistent with the request issued through the uplink signal US (step S80). In one example, in a case where a command included in the uplink signal US indicates an instruction to transmit a tone signal T in the first two time slots and to transmit a data signal D including a writing pressure value in the following time slot, when the content of the received downlink signal DS is consistent with the instruction, the determination result in step S80 is positive, and, when the content is not consistent, the determination result in step S80 is negative.

After obtaining the positive result in step S80, the sensor controller 20 resets the counter 58 (step S81), and determines the current operation mode (step S82). When the result illustrates that the current operation mode is the discovery mode, the sensor controller 20 enters the pairing mode (step S83). Then, the process returns to the determinations in steps S62 and S63.

When the current operation mode is the pairing mode, pairing processing is executed (step S84). This pairing processing includes determining a command to be included in an uplink signal US that is transmitted next, and also includes various types of processing (e.g., position deriving processing based on the result of global scanning and local scanning, processing to output the derived position to the host processor 22, processing to acquire the pen ID transmitted from the stylus S, etc.) based on a downlink signal DS transmitted from the stylus S in response to the command. Subsequently, the sensor controller 20 determines whether or not pairing is established as the result of the pairing processing (step S85). The determination result is positive when reception of a pen ID is completed, and the determination result is negative when reception of a pen ID is not completed.

After obtaining the positive result in step S85, the sensor controller 20 enters the operational mode (step S86), and then, the process returns to the determinations in steps S62 and S63. After obtaining the negative result in step S85, the sensor controller 20 remains in the pairing mode, and the process returns to the determinations in steps S62 and S63.

When determining, in step S82, that the current operation mode is the operational mode, the sensor controller 20 derives the position of the stylus S and acquires transmission data from the stylus S on the basis of the received downlink signal DS (step S87). It is to be noted that, in a case where reception of tone signals T in a plurality of time slots is required to derive the position of the stylus S, the sensor controller 20 may store the reception intensities of tone signals T at the respective sensor electrodes 21X and 21Y in respective time slots, and derive the position on the basis of the stored reception intensities after reception in the last time slot is finished. Also, in a case where reception of data signals D in a plurality of time slots is required to acquire transmission data from the stylus S, the sensor controller 20 may store a piece of the transmission data in each time slot, and collectively acquire the stored pieces as one transmission data set after reception in the last time slot is finished. The sensor controller 20 outputs the derived position and the acquired transmission data to the host processor 22 (step S88). Then, the process returns to the determinations in steps S62 and S63.

After obtaining the negative result in step S80, the sensor controller 20 resets the counter 58 (step S90), as in the case where the positive result is obtained. Accordingly, even in a case where a signal consistent with the request is not transmitted from the stylus S, the pairing with the stylus S is maintained. It is to be noted that the counter 58 is reset at each of steps S81 and S90 in FIG. 13, but the counter 58 may be reset prior to the determination in step S80.

Next, the sensor controller 20 derives the position of the stylus S on the basis of the received signal (tone signal T) (step S91) and outputs the derived position to the host processor 22 (step S92). In a case where, also in step S91, reception of tone signals T in a plurality of time slots is required to derive the position of the stylus S, the sensor controller 20 may store the reception intensities of tone signals T at the respective sensor electrodes 21X and 21Y in the respective time slots, and derive the position on the basis of the stored reception intensities after reception in the last time slot is finished. Further, in step S92, the sensor controller 20 may output not only the derived position but also the writing pressure value (the latest writing pressure value acquired during the operational mode of the stylus S) obtained so far, to the host processor 22. Thereafter, the process in the sensor controller 20 returns to the determinations in steps S62 and S63.

As explained so far, with the stylus S and the sensor controller 20 according to the present embodiment, the possibility that the stylus S fail to receive an uplink signal US can be reduced. Accordingly, occurrence of a situation where the user's writing operation is suddenly disabled can be avoided.

In addition, with the stylus S and the sensor controller 20 according to the present embodiment, even if reception of an uplink signal US fails, transmission of a tone signal T from the stylus S is continued. Therefore, the sensor controller 20 can continuously detect the position of the stylus S, and further, cancellation of pairing can be avoided.

Consequently, occurrence of a situation where the user's writing operation is suddenly disabled can be avoided.

In addition, with the stylus S and the sensor controller 20 according to the present embodiment, in a case where the writing pressure value>0, not a data signal D including the writing pressure value but a tone signal T is transmitted. Thus, compared to a modulation wave (e.g., modulation wave obtained through on-off keying (OOK), amplitude-shift keying (ASK), or phase-shift keying (PSK) modulation) formed by modulating a tone signal on the basis of the writing pressure value, a continuous signal is obtained or the frequency is fixed so that the detection possibility of the sensor controller 20 can be enhanced. Consequently, in a noisy environment where no uplink signal US can be detected, the possibility that the sensor controller 20 successfully detects the stylus S can be increased. It is to be noted that, when the stylus S is transmitting a tone signal T instead of a data signal D including the writing pressure value, the sensor controller 20 may output the last acquired writing pressure value as the current writing pressure value as well as the position obtained during this period of time, to the host processor 22.

The preferred embodiment of the present invention has been described above. However, the present invention is not limited to the above embodiment, and various embodiments of the present invention can be implemented within the scope of the disclosure.

For example, in a case where the writing pressure value>0, not a data signal D including the writing pressure value but a tone signal T is transmitted from the stylus S in the embodiment described above, but, in a case where the writing pressure value>0, a data signal D (signal formed by modulation based on the writing pressure value) including the writing pressure value may be transmitted. In this case, the possibility that the sensor controller 20 detects the stylus S is lowered, compared to the case where the tone signal T is transmitted. However, since the sensor controller 20 in normal operation is likely requesting normal communication of the stylus S (e.g., transmission of a data signal D including the writing pressure value), it is possible to continue normal operation of the system as a whole.

Irrespective of whether a data signal D is transmitted or a tone signal T is transmitted in the communication maintaining mode, as viewed from the host processor 22, the stylus S and the sensor controller 20 appear to operate normally even in a case where the stylus S actually fails to detect an uplink signal US. Thus, a robust system including the stylus S and the sensor controller 20 can be provided. Therefore, it becomes possible to prevent occurrence of line cut, which is annoying to a user, which results from the stylus S's failure to detect an uplink signal US, which is not necessary for the purpose of detecting the position of the stylus S.

FIG. 14 is a sequence diagram of operations of the stylus S and the sensor controller 20 according to a modification of the present embodiment. The stylus S according to the present modification differs from the stylus S according to the embodiment described above in that, in step S31 in FIG. 10, the stylus S according to the present modification determines the predetermined periods of time P2, P3, and P4 on the basis of a cycle UpIntv' the value of which is different from the cycle UpIntv. It is to be noted that a case where UpIntv'<UpIntv is illustrated in FIG. 14, but UpIntv'>UpIntv may be set. Moreover, FIG. 14 illustrates an example where P2=UpIntv'/4, P3=UpIntv'/2, and P4=UpIntv'/4, but any one or more of the predetermined periods of time P2, P3, and P4 may be set to a value different from that of the embodiment described above. Accordingly, in a case where the stylus S cannot receive an uplink signal US because a timing for the stylus S to execute the uplink signal US receiving operation deviates from a timing for the sensor controller 20 to execute the uplink signal US transmitting operation, the stylus S can receive an uplink signal US after a while.

The invention claimed is:

1. A method, comprising:
   transmitting, from a sensor controller to a stylus operating in a discovery mode, a first uplink signal;
   performing bidirectional communication, by the sensor controller and the stylus operating in a operational mode, based on a first schedule that is configured by the first uplink signal, wherein the stylus shifts from the discovery mode to the operational mode in response to receiving the first uplink signal;
   performing, by the stylus operating in the operational mode, a reception operation to receive a second uplink signal transmitted from the sensor controller after the first signal;
   when the stylus does not receive the second uplink signal in the reception operation based on the first schedule, shifting, by the stylus, from the operational mode to a communication maintaining mode, and performing, by the stylus operating in the communication maintaining mode, the reception operation based on a second schedule that is different from the first schedule;
   shifting, by the stylus, from the communication maintaining mode to the operational mode when the stylus receives the second uplink signal based on the second schedule; and
   shifting, by the stylus, from the communication maintaining mode to the discovery mode when the communication maintaining mode times out.

2. The method according to claim 1, wherein:
   based on the first schedule, the stylus performs the reception operation during a first period; and
   based on the second schedule, the stylus performs the reception operation during a second period that is longer than the first period.

3. The method according to claim 2, wherein:
   the first period starts at time T1 and ends at time T2; and
   the second period starts at time T1 and ends at time T3 that is after time T2.

4. The method according to claim 2, wherein:
   the first period starts at time T1 and ends at time T2; and
   the second period starts at time T4 that is after time T2 and ends at time T5.

5. A stylus, comprising:
   a pen electrode; and
   processing circuitry which, in operation,
      operates in a discovery mode and receives a first uplink signal, which is transmitted from a sensor controller, via the pen electrode;
      shifts from the discovery mode to an operational mode in response to receiving the first uplink signal;
      operates in the operational mode to perform bidirectional communication with the sensor controller based on a first schedule that is configured by the first uplink signal, and to perform a reception operation to receive a second uplink signal transmitted from the sensor controller after the first uplink signal;

in response to not receiving the second uplink signal in the reception operation based on the first schedule, shifts from the operational mode to a communication maintaining mode and performs the reception operation based on a second schedule that is different from the first schedule;

shifts from the communication maintaining mode to the operational mode in response to receiving the second uplink signal based on the second schedule; and shifts from the communication maintaining mode to the discovery mode when the communication maintaining mode times out.

6. The stylus according to claim 5, wherein the processing circuitry:

based on the first schedule, performs the reception operation during a first period; and based on the second schedule, performs the reception operation during a second period that is longer than the first period.

7. The stylus according to claim 6, wherein:
the first period starts at time T1 and ends at time T2; and
the second period starts at time T1 and ends at time T3 that is after time T2.

8. The stylus according to claim 6, wherein:
the first period starts at time T1 and ends at time T2; and
the second period starts at time T4 that is after time T2 and ends at time T5.

* * * * *